United States Patent [19]

Carbrey

[11] 3,833,822

[45] Sept. 3, 1974

[54] RIPPLE FREE COUNTER

[75] Inventor: Robert Lawrence Carbrey, Boulder, Colo.

[73] Assignee: Bell Telephone Laboratories, Incorporated, Murray Hill, N.J.

[22] Filed: Dec. 21, 1972

[21] Appl. No.: 317,183

[52] U.S. Cl. ..... 307/225 C, 307/220 C, 307/224 C, 307/279, 307/304

[51] Int. Cl. .......... H03k 23/08

[58] Field of Search ........ 307/220 C, 221 C, 222 C, 307/223 C, 224 C, 225 C, 221 R, 223 B, 225 R, 304, 279; 328/48, 42

[56] References Cited

UNITED STATES PATENTS

| | | | |
|---|---|---|---|
| 3,149,286 | 9/1964 | Simmons | 328/50 |
| 3,573,507 | 4/1971 | Eng | 307/279 |
| 3,600,686 | 8/1971 | Halsall | 328/48 |

OTHER PUBLICATIONS

Hibberd, Integrated Circuits (TI electronics Series, McGraw-Hill, 1969), pp. 116–117.

*Primary Examiner*—Rudolph V. Rolinec
*Assistant Examiner*—William D. Larkins
*Attorney, Agent, or Firm*—J. S. Cubert

[57] ABSTRACT

A ripple free counter includes a plurality of cascaded stages and an input stage. The input stage input is connected to a voltage source and counting signals are applied to all stages simultaneously. Each stage includes first and second storage devices operative in first and second states. The second storage device is connected to the stage output. A first switching arrangement is responsive to the counting signal and the first storage device being in its first state to connect the stage input to the stage output. When all preceding stages have their first storage devices in their first state, the source voltage is applied to the stage input via the series connected first switching arrangements of all preceding stages to place the stage second storage device in its first state. A second switching arrangement is responsive to the counting signal and the stage first storage device being in its second state to place the second storage device in its second stage. Upon termination of the counting signal, a third switching arrangement is responsive to the stage second storage device being in its first stage and the second storage device of the immediately preceding stage being in its first state to place the stage first storage device in its second state and is responsive to the stage second storage device being in its second stage and the second storage device of the immediately preceding stage being in the first state to place the first storage device of the stage in its first state.

25 Claims, 10 Drawing Figures

RIPPLE FREE COUNTER

BACKGROUND OF THE INVENTION

This invention relates to electronic counters and more particularly to multistage electronic binary counter circuits.

Electronic counters are used extensively in information processing systems of various types. Such counters generally employ a plurality of cascaded stages. In many types of counters, counter stages operate successively, i.e., each stage is triggered after the preceding stage has been switched to its desired state. Consequently, there is a ripple type delay in the operation of each cascaded stage which results in a significant delay during each change of counter state. Counters wherein the ripple delay has been eliminated are known. These ripple free counters utilize external gating logic to decode the states of the counter stages whereby all stages can be triggered in the same time interval. The gating logic, however, increases the complexity of the counter by adding connections between the gating logic and the various counter stages and increases the power requirements of the counter. The complexity of circuit interconnections and the necessary gating logic is substantially increased when the number of counter stages is larger. It is therefore desirable to provide ripple free electronic counter operation without the addition of separate gating circuitry.

BRIEF SUMMARY OF THE INVENTION

The invention is a counter comprising a source of signals to be counted and at least one stage that includes an input and first and second stores each operative in first and second states. The signal to be counted is applied to the input of a first stage. In response to the signal to be counted, the second store of the first stage is placed in the same state as that of the first stage first store. Upon termination of the signal to be counted, the first stage first store is placed in a state opposite to the state of the first stage second store.

The second store of each other stage is placed in its first state jointly responsive to the signal to be counted and the stage first store as well as all preceding stage first stores being in their first states. The stage second store is placed in its second state jointly responsive to the signal to be counted and the stage first store being in its second stage. Upon termination of the signal to be counted, the stage first store is placed in the state opposite to the state of the stage second store responsive to the second store of the immediately preceding stage being in its first state.

According to one aspect of the invention, the counter comprises a plurality of cascaded stages each having an input connected to the output of the immediately preceding stage. Each stage includes first and second storage devices operative in first and second states. In response to a signal to be counted, the seconnd storage device in a particular stage is placed in its first state if the first storage device in all preceding stages and the particular stage are in their first states. The particular stage second storage device is placed in its second state responsive to the signal to be counted if the particular stage first storage device is in its second state. Upon the termination of the signal to be counted, the particular stage first storage device is placed in its second state responsive to the second storage device of the immediately preceding stage being in its first state and the particular stage second storage device being in its first state. In the event that the immediately preceding stage second storage device is in its first state and the particular stage second storage device is in its second state upon the termination of the signal to be counted, the particular stage first storage device is placed in its first state. In this manner, the particular stage is switched to the first state only if all the preceding stages are in their first states and all the preceding stages are thereupon switched to their second states whereby the state of the counter is changed without ripple type delay.

According to another aspect of the invention a counter includes a plurality of stages and an input stage. The output of each stage is connected to the input of the immediately succeeding stage. The input stage input is connected to a first signal source. A second signal is applied to all stages simultaneously in response to the signal being counted. Each stage includes first and second storage devices operative in first and second states and the second storage device of the stage is connected to the stage output. In response to the second signal applied to the stage and the stage first storage device being in its first state, a first switching arrangement connects the stage input to the stage output and the first signal is applied via the first switching arrangements of all preceding stages to the stage second storage device to place said stage second storage device in its first state. A second switching arrangement is responsive to the second signal applied to the stage and the stage first storage device being in its second state to place the stage second storage device in the second state.

Upon termination of the second signal, a third switching arrangement is responsive to the stage second storage device being in its second state and the second storage device of the immediately preceding stage being in its first state to place the stage first storage device in its first state. When the stage second switching device is in its first state and the second switching device of the immediately preceding stage is in its first state at the termination of the second signal, a fourth switching arrangement is operative to place the stage first storage device in its second state.

According to another aspect of the invention, the state of the first storage device of a stage represents the state of that counter stage and the stage second storage device is utilized as a temporary store operative through the third and fourth switching arrangements to alter the state of the first storage device and to control the state of the first storage device of the immediately succeeding counter stage. The second storage device of a particular stage is put into its first state responsive to the signal being counted if the particular stage and all preceding stages are in their first states. The first storage device of the next succeeding stage is placed in the first state responsive to the signal being counted if the second storage device of the particular stage is in its first state and the next succeeding stage second storage device is in its second state. In this manner, a stage is switched to the first state responsive to the pulse being counted when all the preceding stages are in their first states; and each of all the preceding stages is switched to its second state responsive to its second storage device being in its first state.

According to another aspect of the invention, each of the switching arrangements comprises at least one insulated gate field effect (IGFET) transistor and the first and second storage devices comprise storage capacitors.

According to another aspect of the invention, all of the IGFET transistors in each stage are of one conductivity type.

According to another aspect of the invention, all the stages of the counter are reset in one assigned time interval through the application of a reset signal to one terminal of each second storage capacitor.

According to another aspect of the invention, all stages of the counter are reset in one assigned time interval through application of a reset signal to one terminal of each first storage capacitor.

According to another aspect of the invention, each signal to be counted generates first and second successively occurring pulses. The first pulse is applied to the second storage capacitor of each stage to place said second storage capacitor in its first state through the first IGFET switching arrangement of all preceding stages and said stage if the first storage capacitor of each of all preceding stages and said stage is in its first state. The second IGFET switching arrangement is responsive to the first pulse being applied to the stage while the stage first storage capacitor is in its second state to place the stage second storage capacitor in its first state. The third IGFET switching arrangement is responsive to the second pulse when the second storage capacitor of the immediately preceding stage is in its first state and the second storage capacitor of the stage is in its second state to place the stage first storage capacitor in its first state. In the event the second storage capacitor of the immediately preceding stage is in its first state and the stage second storage capacitor is in its first state, a fourth IGFET switching arrangement is responsive to the second pulse to place the stage first storage capacitor in its second state.

According to another aspect of the invention, each signal to be counted generates yet a third pulse occurring subsequent to said second pulse. The second storage capacitor of each stage is unconditionally placed in its second state responsive to said third occurring pulse.

DETAILED DESCRIPTION

Figure 1:
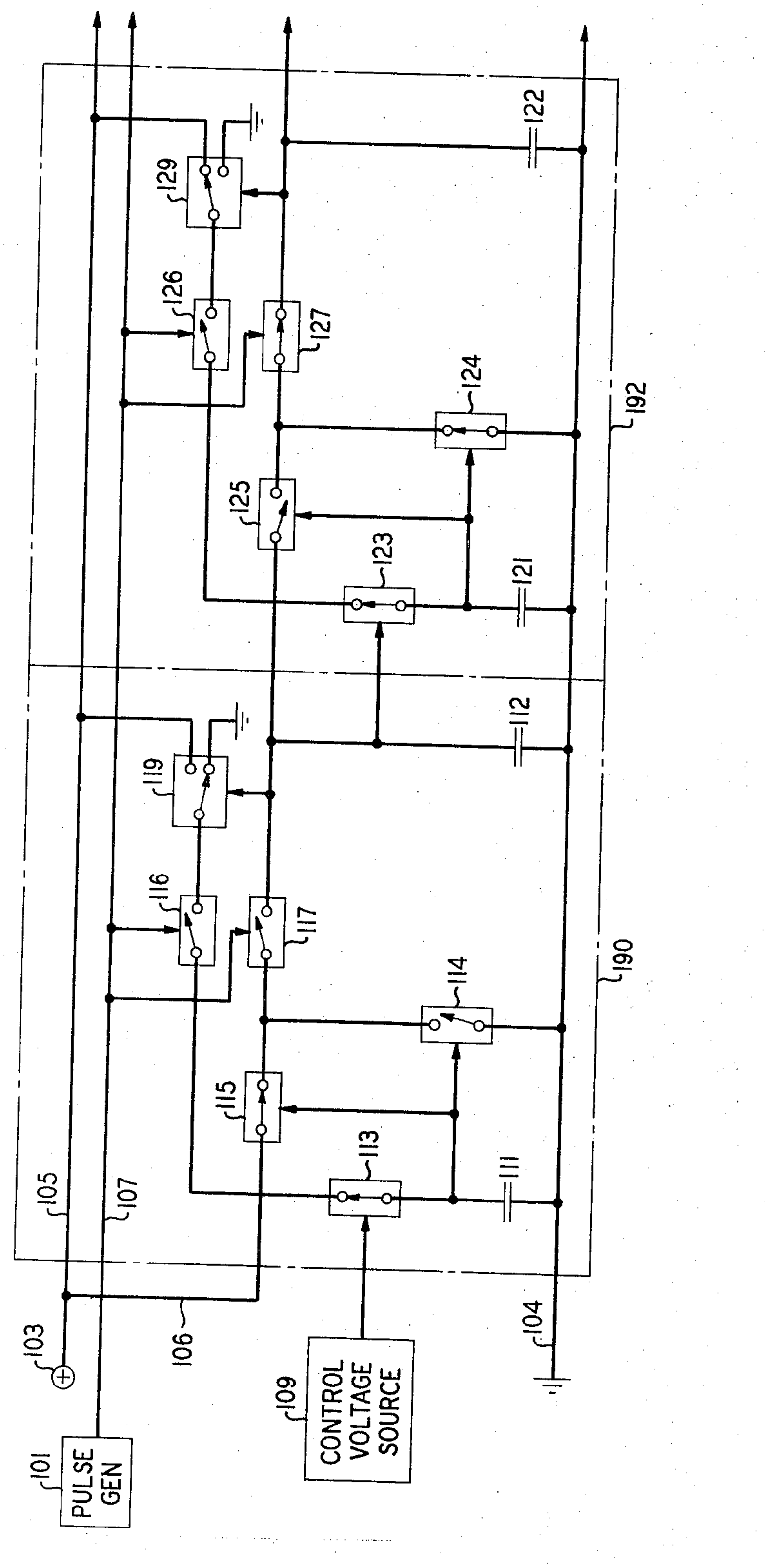
FIG. 1 depicts a block diagram of a counter illustrative of the invention.

FIG. 1 shows two stages of a multistage counter in accordance with the invention wherein each stage includes a pair of capacitor stores and a plurality of voltage controlled switches. In FIG. 1, positive voltage source 103 is a charging source for each stage of the counter. The output of pulse generator 101 is a series of signals to be counted and control voltage source 109 provides a positive pulse which enables the operation of the ccounter. Stage 190 is the input stage of the counter and includes storage capacitor 111 which stores the state of the input counter stage and storage capacitor 112 which operates as a temporary store to transfer the state of this counter stage to the next succeeding stage. In like manner, storage capacitor 121 stores the state of the counter stage 192 and storage capacitor 122 is operative as a temporary store to transfer the state of counter stage 192 to the next succeeding stage (not shown).

The switches in the counter stages of FIG. 1 are voltage controlled and in electronic counters may comprise bipolar or field effect transistors. Switches 116, 117, 126 and 127 are controlled by the sequence of pulses from pulse generator 101 applied via lead 107 shown on waveform 801 of FIG. 8 in response to the counting signals applied to generator 101 shown in waveform 800. Switches 114 and 115 are controlled by the voltage across storage capacitor 111. When the voltage across capacitor 111 is a high positive voltage indicating a one state, switch 115 is closed and switch 114 is open; and when the voltage across capacitor 111 is low indicating a zero state, switch 114 is closed and switch 115 is open. In similar fashion, the voltage across storage capacitor 121 in stage 192 controls the condition of switches 124 and 125. Switch 119 is controlled by the voltage across storage capacitor 112 so that switch 119 is connected to ground reference potential when the voltage across capacitor 112 is high and switch 119 is connected to positive voltage source 103 when the voltage across capacitor 112 is low. Similarly, switch 129 is controlled by the voltage across storage capacitor 122. In stage 192, switch 123 is closed only if the voltage across capacitor 112 is high. Switch 113 is closed when a positive voltage is applied from control voltage source 109 to enable the counter.

Figure 8:
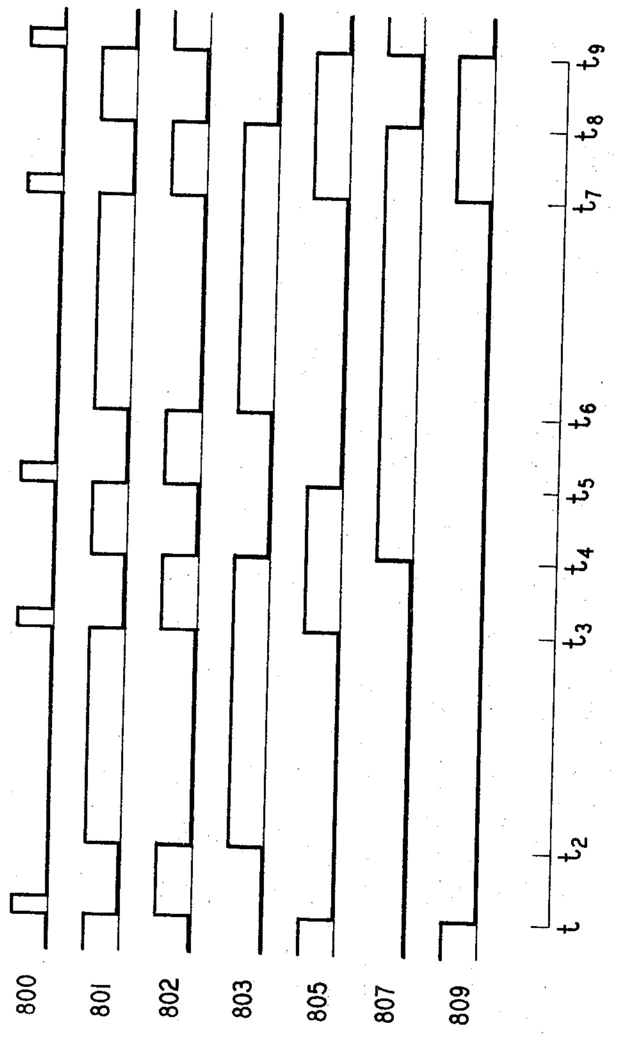
FIG. 8 shows waveforms useful in describing the multistage counters depicted in FIGS. 1–5.

Assume for purposes of illustration that each of storage capacitors 111, 112, 121 and 122 is in its zero state, having a low voltage thereacross so that stages 190 and 192 are both in the zero state. Waveforms 803, 805, 807 and 809 of FIG. 8 show the voltages across storage capacitors 111, 112, 121 and 122 respectively. All of these capacitors are in their zero states at time t1 in FIG. 8. Switch 113 is closed in response to a positive voltage from source 109 so that the counter is enabled. Switch 113 remains closed when the counter is operating. Between times t1 and t2, switch 115 is open and switch 114 is closed responsive to the zero state voltage on capacitor 111. Switch 119 is connected to positive voltage source 103 responsive to the zero state voltage across capacitor 112. Switch 116 is open and switch 117 is closed responsive to the low voltage on lead 107 (waveform 801). Similarly, switch 125 is open and switch 124 is closed responsive to the zero voltage on capacitor 121. Switch 129 is connected to positive voltage source 103 responsive to the low voltage on capacitor 122; switch 126 is open while switch 127 is closed responsive to the low voltage on lead 107; and switch 123 is open responsive to the zero voltage state of capacitor 112.

At time t2, the high voltage applied to lead 107 (waveform 801) from pulse generator 101 causes switch 116 to be closed and switch 117 to be opened. Similarly switch 127 is opened and switch 126 is closed at time t2. At this time, a conductive path is established from positive voltage source 103 through switches 119, 116 and 113 to charge capacitor 111 to a high positive voltage as indicated in waveform 803. Capacitor 121 remains uncharged since switch 123 is open responsive to the zero state voltage across storage capacitor 112. Thus, counter state 190 is in its one state and counter stage 192 is in its zero state.

At time t3, in FIG. 8, the voltage on lead 107 becomes low so that switch 116 is opened and switch 117 is closed. Since capacitor 111 is charged to a positive voltage, switch 115 is also closed and a conducting path is established between positive source 103 and storage capacitor 112 through switches 115 and 117 whereby this storage capacitor is charged to a high positive voltage between times t3 and t4 (waveform 805). The high positive voltage across capacitor 112 causes switch 123 to be closed just after t3.

At time t4, the voltage on lead 107 becomes high whereby a conductive path is established between voltage source 103 and capacitor 121 through switches 123, 126 and 129. In this way, capacitor 121 is charged to positive voltage as indicated on waveform 807 at time t4. Also switch 119 is connected to ground reference potential responsive to the high positive voltage on capacitor 112 and capacitor 111 is discharged to the ground reference potential through switches 113, 116 and 119. In this way, the first stage of the counter is placed in its zero state while the second stage of the counter is placed in its one state at time t4.

The voltage on lead 107 becomes low at time t5. Switch 114 is closed responsive to the low voltage across capacitor 111, and switch 117 is closed responsive to the low voltage on lead 107. Consequently, storage capacitor 112 is discharged to ground reference potential. The high voltage on lead 107 at time t6 closes switch 116 and opens switch 117. Switch 119 is connected to positive voltage source 103 responsive to the low voltage across capacitor 112 so that storage capacitor 111 is charged to a positive voltage as indicated on waveform 803 at time t6. Just after this time, the first stage of the counter is in its one state and the second stage of the counter is also in its one state.

Switches 117 and 127 are closed and switches 116 and 126 are opened responsive to the low voltage on lead 107 at time t7. Since both capacitors 111 and 121 are in their one states, switches 115 and 125 are also closed whereby both storage capacitors 112 and 122 are positively charged. When the voltage across each of capacitors 112 and 122 is high, switches 119 and 129 are both connected to ground reference potential. Capacitors 111 and 121 are then discharged to ground reference potential at time t8 when switches 116 and 126 are closed in response to the high voltage signal on lead 107. Thus just after time t8, both counter stages are in the zero states. Capacitors 112 and 122 are discharged to ground reference potential at time t9 since both switches 114 and 124 are closed responsive to the low voltages across capacitors 111 and 121 and switches 117 and 127 are closed responsive to the low voltage on lead 107. In this manner, the circuit shown in FIG. 1 operates as a binary counter.

While only the operation of two successive stages is shown in FIG. 1 it is to be understood that the operation described is readily extendible to counters using three or more stages. As illustrated in FIG. 1, the counter in accordance with the invention responds to an input pulse by switching all successive lower order stages which are in the one state to the zero state; and at the same time the lowest order zero state stage is switched to the one state. The remaining higher order stages are not altered. The change in counter states is accomplished without delays due to sequential switching of the counter stages and without the addition of external gating networks.

Figure 2:
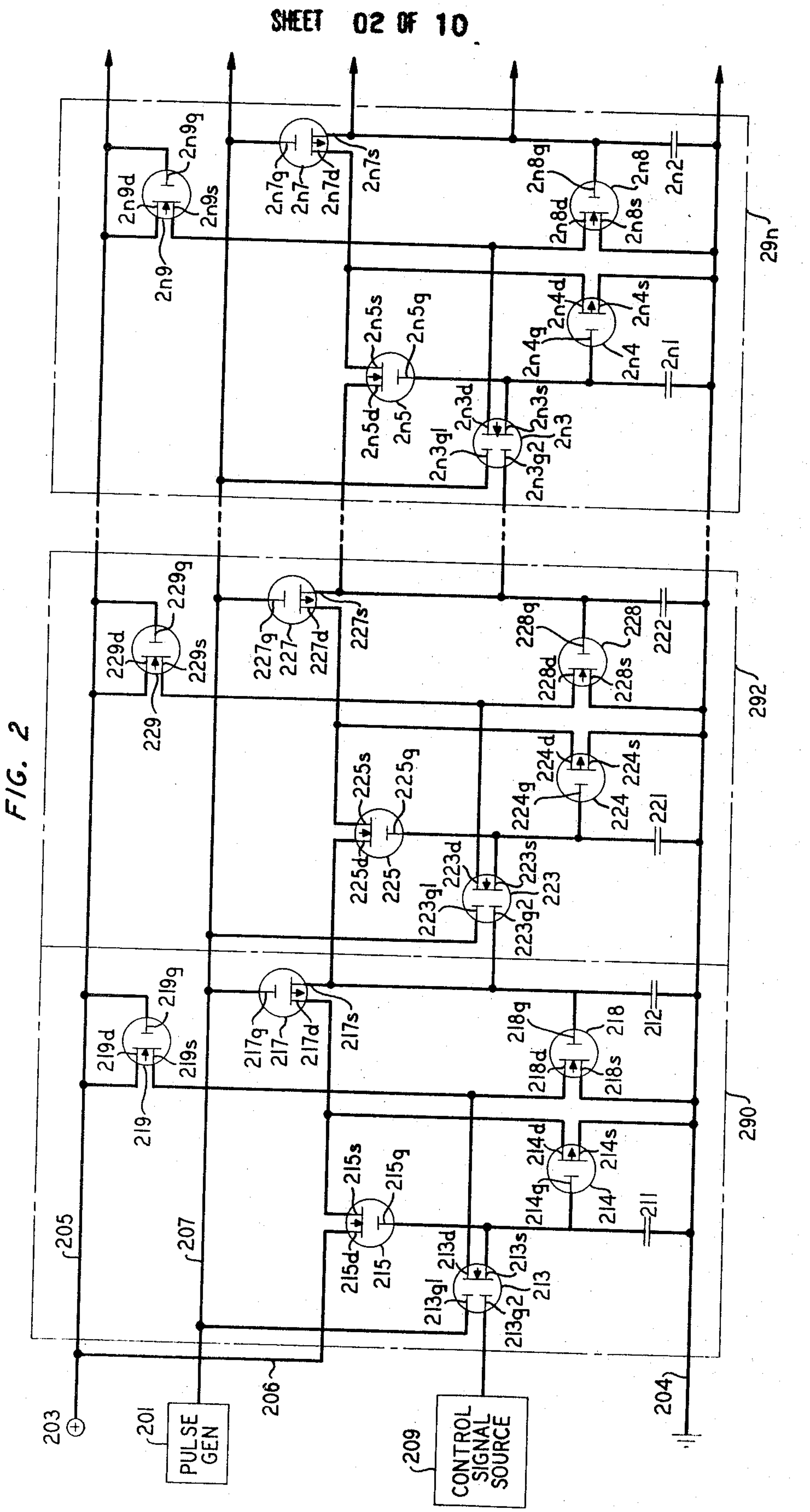
FIG. 2 depicts a multistage counter utilizing insulated gate field effect transistor switches and capacitor stores illustrative of the invention.

FIG. 2 shows an embodiment of the invention wherein the binary counter comprises stages 290, 292 and 29*n*. Each stage includes a pair of storage capacitors and a plurality of insulated gate field effect transistor (IGFET) switches. Stage 290, for example, includes n-type IGFETs 213, 215, 218 and 219 and p-type IGFETs 214 and 217. As is well known in the art, each n-type IGFET provides a conductive path between its source and its drain responsive to a high positive signal applied to its gate electrode and each p-type IGFET provides a conductive path between its source and drain electrodes only when a low voltage is applied to its gate electrode. N-type IGFET 215 is rendered conductive while p-type IGFET 214 is rendered nonconductive by a high voltage across storage capacitor 211. A low voltage across storage capacitor 211 causes IGFET 215 to be nonconductive and IGFET 214 to be conductive. N-type IGFET 213 includes two gate electrodes and is conductive only if a positive voltage is applied to each gate electrode at the same time.

The voltage across storage capacitor 212 controls the conductive state of n-type IGFET 218 whereby the source-drain path of IGFET 218 is rendered conductive only when a high positive voltage exists across storage capacitor 212. The source drain-path of IGFET 218 is rendered nonconductive when a low positive voltage appears across storage capacitor 212. The application of a low positive pulse from pulse generator 201 to gate 217*g* of p-type IGFET 217 results in its source-drain path being conductive. When the output of pulse generator 201 is high, the source-drain path of p-type IGFET 217 is nonconductive. IGFET 219 is operative as a resistive device since gate 219*g* and drain 219*d* are commonly connected to positive voltage source 203. Gate 213*g*1 is connected to pulse generator 201 and gate 213*g*2 is connected to control signal source 209. A positive voltage from control signal source 209 is operative to enable the counter of FIG. 2. IGFET 213 is rendered conductive when both the positive pulse from source 209 and a positive pulse from generator 201 are applied to gates 213*g*2 and 213*g*1, respectively. The IGFET switches in stages 292 and 29n are substantially similar to those described with respect to stage 290.

Assume, for purposes of illustration, that each of capacitors 211, 212, 221 and 222 is in its zero state having a low voltage thereacross. The low voltages across capacitors 211, 212, 221 and 222 are shown in waveforms 803, 805, 807 and 809, respectively, at time t1. Between times t1 and t2, the output of pulse generator 201 shown in waveform 801 is low whereby p-type IGFETs 217, 227 and 2n7 are rendered conductive. Since storage capacitor 211 has a low voltage thereacross, n-type IGFET 215 is nonconductive so that no current is applied to IGFET 217. Thus capacitors 212 and 222 are disconnected from positive voltage source 203 and the voltages across capacitors 212 and 222 (waveforms 805 and 809, respectively) remain low.

At time t2, IGFETs 217, 227 and 2n7 are rendered nonconductive by the positive pulse from generator 201 (waveform 801). IGFET 213 is rendered conductive because of the positive signal on gate **213*g*1 from generator 201 and the positive signal on gate 213*g*2 from source 209. Since the voltage across storage capacitor 212 is low at this time, n-type IGFET 218 is nonconductive and a conductive path is established from positive voltage source 203 to storage capacitor 211 through IGFET 219 and now conducting IGFET 213. In this way, capacitor 211 is charged to a high positive voltage (one state). Storage capacitor 221 remains uncharged because the low voltage on capacitor 212 keeps IGFET 223 nonconductive. Thus, shortly after time t2, counter stages 290 is in its one state and counter stage 292** is in its zero state.

At time t3, IGFET 213 is rendered nonconductive by the low voltage output of pulse generator 201 (waveform 801) but p-type IGFETs 217 and 227 become conductive. At this time, IGFET 215 is conductive because of the high positive voltage across storage capacitor 211 and a conductive path is established from positive voltage source 203 through IGFETs 215 and 217 to storage capacitor 212. In this way, storage capacitor 212 is charged to its one state shortly after time t3 (waveform 805). Since storage capacitor 221 is uncharged at time t3, n-type IGFET 225 is nonconductive and storage capacitor 222 remains in its low voltage state.

At time t4, the output of pulse generator 201 becomes high, and IGFETs 217 and 227 are nonconductive. In stage 290, IGFET 213 is rendered conductive responsive to the positive voltages on gate **213*g*1 and 213*g*2 and IGFET 218 is rendered conductive by the high voltage applied to gate 218g from storage capacitor 212. A conductive path is established from storage capacitor 211 through IGFETs 213 and 218 to ground reference potential whereby storage capacitor 211 is discharged to ground reference potential (zero state). In stage 292, IGFET 223 is conductive responsive to the positive signal from generator 201 applied to gate 223*g*1 and the high positive signal from storage capacitor 212 applied to gate 223*g*2. IGFET 228 is nonconductive since storage capacitor 222 is in its zero state and a low voltage is applied to gate 228*g* of IGFET 228. Thus, there is a conductive path established from positive voltage source 203 through IGFETs 229 and 223 to charge storage capacitor 221 to its high or one state. As indicated in waveforms 803 and 807 at time t4, storage capacitor 211 is switched from its one state to its zero state and storage capacitor 221 is switched from its zero state to its one state so that counter stage 290 is in its zero state and counter stage 292** is in its one state.

At time t5, the low voltage from pulse generator 201 causes IGFETs 217 and 227 to be conductive. At this time, the low voltage on storage capacitor 211 is applied to gate **214*g* of p-type IGFET 214 and a conductive path is established from storage capacitor 212 through IGFETs 217 and 214 to ground reference potential. Since IGFET 215 is nonconductive, storage capacitor 212 is discharged to its zero state shortly after t5 as indicated on waveform 805.**

At time t6, the positive output of generator 201 causes IGFET 213 to conduct. IGFET 218 is nonconductive because of the low voltage output on capacitor 212 so that storage capacitor 211 is charged from positive source 203 via IGFETs 219 and 213 to its one state. Storage capacitor 221 remains in its one state since IGFET 228 is nonconductive due to the low voltage across storage capacitor 222. Both counter stages 290 and 292 are then in their one states.

At time t7, storage capacitor 212 is charged to its one state from positive voltage source 203 through conducting IGFETs 215 and 217 and storage capacitor 222 is charged to its one state from positive voltage source 203 through the series path including IGFETs 215, 217, 225 and 227. IGFETs 215 and 225 are conductive responsive to the high positive voltages on capacitors 211 and 221 respectively and IGFETs 217 and 227 are conductive responsive to the low voltage at the output of generator 201. At time t8, IGFETs 217 and 227 become nonconductive and IGFET 213 becomes conductive responsive to the positive going pulse from generator 201. IGFETs 223 and 218 are also conductive since storage capacitor 212 is in its high voltage state and IGFET 228 is conductive since storage capacitor 222 is in its high voltage state. Thus, storage capacitor 211 in stage 290 is discharged to its low voltage state through IGFETs 213 and 218 and storage capacitor 221 in stage 292 is discharged to its low voltage state through IGFETs 223 and 228. Both counter stages 290 and 292 are then in their zero states.

Stage **29*n* in FIG. 2 is connected to stage 292 through intermediate stages not shown. In order to switch stage 29*n* to the one state it is required that the second storage device of the stage immediately preceding 29*n* be in its one state and storage capacitor 2*n*2, the second storage capacitor of stage 29*n*, be in its zero state. Under these conditions, IGFET 2*n*3 is conductive responsive to the next occurring positive going pulse from generator 201 but IGFET 2*n*8 is nonconductive responsive to the low voltage state of storage capacitor 2*n*2. The only conductive path in stage 29*n* established at this time is the path from positive voltage source 203 to capacitor 2*n*1 through IGFET 2*n*9 and IGFET 2n3 whereby storage capacitor 2*n*1** is charged to its high voltage state.

Stage 29n includes n-type IGFET **2*n*5 and p-type IGFET 2*n*7. When the output of pulse generator 201 is low, storage capacitor 2n2 is charged to its high voltage state through the series path from positive voltage source 203 including IGFETs 215, 217, 225, 227 and the corresponding IGFETs of all stages intermediate stage 292 and 29*n*. This occurs only if the first storage capacitor of each of these stages is in the high voltage state. Under these conditions, a positive voltage is applied to drain electrode 2*n*5*d*. When capacitor 2*n*1 is also in the high voltage state at this time, IGFET 2*n*5 is conductive and the positive voltage from source 203 is supplied through IGFETs 2*n*5 and 2*n*7 to charge capacitor 2*n*2. Thus, in accordance with the invention, the charging of capacitor 2*n*2 requires that first storage capacitor 2*n*1 and the first storage capacitor of each of the preceding stages be in their high voltage states. When capacitor 2*n*2 is charged to the high voltage state and the output of generator 201 becomes low, IGFET 2*n*3 is rendered conductive. This is so because storage capacitor of the immediately preceding stage is in the high voltage state. IGFET 2n8 is conductive responsive to the high voltage state of capacitor 2n2 and a conductive path is then established between storage capacitor 2n1 and the ground reference potential through IGFET 2n3 and IGFET 2n8. Capacitor 2n1** is thereby discharged to the low voltage state.

Figure 3:
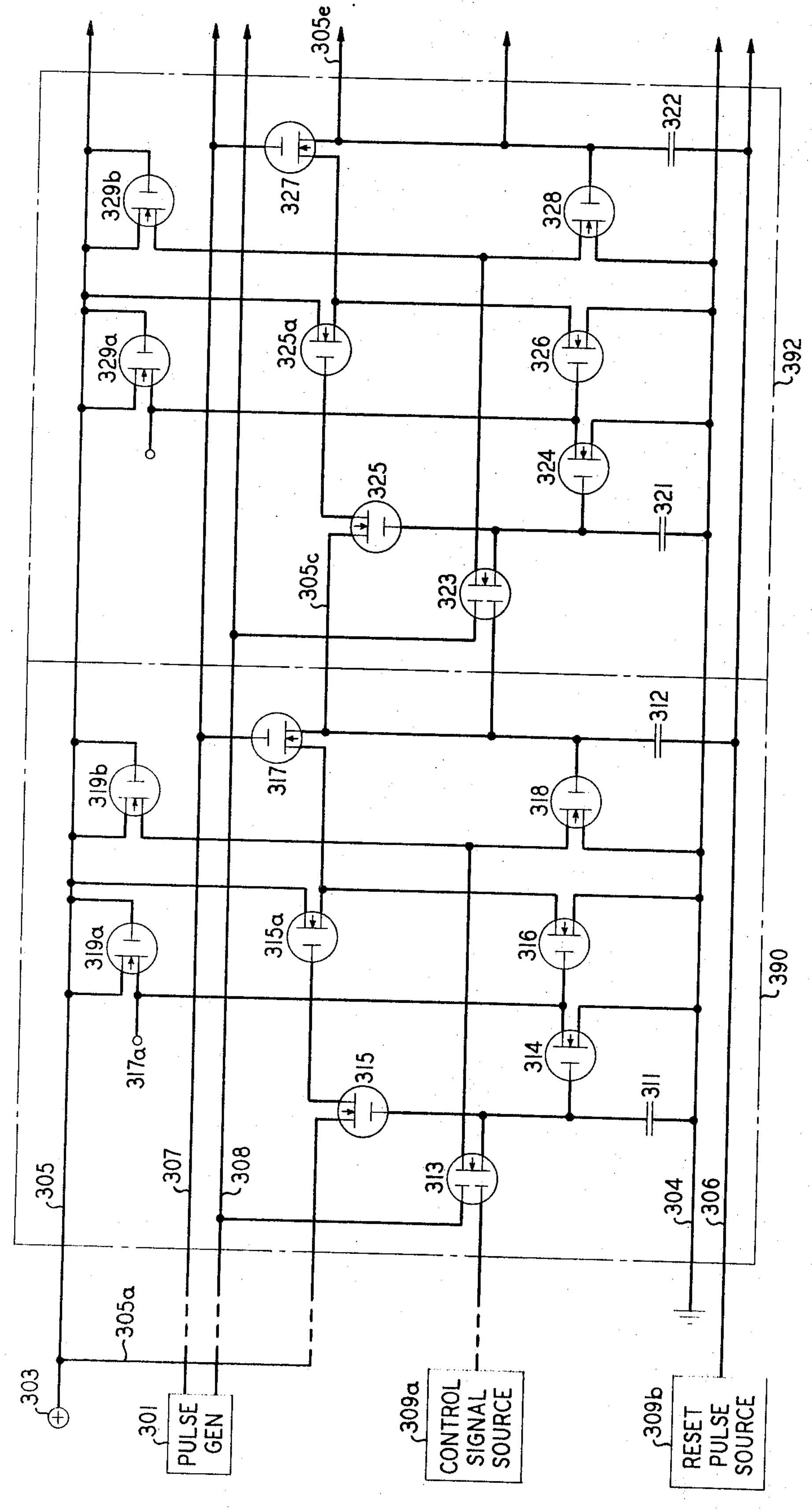
FIG. 3 depicts another multistage counter utilizing one polarity type IGFET and capacitor stores illustrative of the invention.

FIG. 3 shows a two stage counter arrangement similar in operation to that described wiith respect to FIG. 2 except that (1) only n-type IGFETs are utilized in each stage, (2) source follower IGFET 315a is added to stage 390 and source follower IGFET 325a is added to stage 392, and (3) additional arrangements are made to simultaneously reset all stages of the counter to an initial state responsive to a separately generated reset pulse. Stage 390 includes IGFETs 313, 315, 318 and 319b. The operation of these IGFETs is substantially the same as IGFETs 213, 215, 218 and 219, respectively, in FIG. 2. IGFET 317 is an n-type IGFET which conducts only when a high positive voltage signal is applied to its gate electrode. In order to provide the proper signals to IGFET 317, pulse generator 301 supplies the signals illustrated in waveform 802 via lead 307. IGFET 313 receives the pulse generator signals shown in waveform 801 through lead 308. P-type IGFET 214 of FIG. 2 is replaced by cascaded IGFETs 314 and 316 in FIG. 3. IGFET 319A operates as a resistive device to supply current to the drain electrode of IGFET 314. The complement of the state of capacitor 311 is available for use by external devices at terminal 317a. When storage capacitor 311 is in its high state, n-type IGFET 314 is rendered conductive so that a low voltage is applied to the gate of IGFET 316. This low voltage renders the source drain path of IGFET 316 nonconductive. When storage capacitor 311 is in its low voltage state, IGFET 314 is nonconductive whereby a high voltage level is applied to the gate of IGFET 316 so that IGFET 316 is conductive. In this way, two n-type IGFETs 314 and 316 replace p-type IGFET 214 in FIG. 2.

IGFET 315a operates as a source follower with its drain connected to positive voltage 303 via lead 305, its source connected to the junction between the drains of IGFETs 317 and 316, and its gate connected to the source of IGFET 315. Similarly IGFET 325a has its drain connected to lead 305, its source connected to the junction between the drains of IGFETs 327 and 326 and its gate electrode connected to the source of IGFET 325. IGFETs 315a and 325a operate as noninverting amplifiers. When IGFET 315 is conductive, a high positive voltage appears at the gate of IGFET 315a and IGFET 315a conducts. This arrangement provides a superior current source for charging capacitor 312 through IGFET 317. IGFET 325a conducts responsive to the high positive voltage applied to its gate from voltage source 303 via IGFETs 315, 315a, 317 and 325 whereby a better current source is provided to charge capacitor 322 via IGFET 327. With these modifications, the waveforms shown in FIG. 8, wherein the voltage across storage capacitors 311, 312, 321 and 322 are shown in waveforms 803, 805, 807 and 809 respectively, illustrate the operation of the counter of FIG. 3. The counter circuit of FIG. 3 is then substantially the same as described with respect to FIG. 2.

The circuit of FIG. 2 contains no means for resetting all stages of the counter according to the invention to an initial state at the same time. In FIG. 3, each of the second storage capacitors, e.g., 312 and 322, is connected to reset pulse source 309b via lead 306. When it is desired to reset the counter to an initial state, reset pulse source 309b supplies a positive pulse in coincidence with one of the pulses on waveform 801 to lead 306. This reset pulse is passed through capacitors 312 and 322 to the gate electrodes of IGFETs 318 and 328 whereby these IGFETs become conductive. At this time, there is a positive pulse on lead 308 (waveform 801) so that IGFETs 313 and 323 are rendered conductive provided that there is a positive output from control signal source 309a. In this way, a conductive path is established between storage capacitor 311 and ground reference potential through conducting IGFETs 313 and 318 so that capacitor 311 is discharged. A separate conductive path is established at the same time between storage capacitor 321 and ground reference potential through IGFETs 323 and 328 whereby capacitor 321 is discharged.

During the next immediately succeeding time interval, a positive pulse appears on lead 307 from generator 301 (waveform 802) which positive pulse causes IGFETs 317 and 327 to conduct. Since storage capacitors 311 and 321 are in their low voltage states, IGFETs 314 and 326 are nonconductive and IGFETs 316 and 326 are conductive. A conductive path is then established from capacitor 312 through IGFETs 317 and 316 to ground reference potential whereby capacitor 312 is discharged to its low voltage state. Similarly, a conductive path is established from capacitor 322 through IGFETs 327 and 326 to ground reference potential whereby 322 is discharged to its low voltage state. Advantageously, the counter arrangement shown in FIG. 3 may be simply constructed in integrated form since only n-type IGFETs are utilized and the counter of FIG. 3 may be reset to an initial state utilizing reset pulse source 309b and the connections to lead 306.

Figure 4:
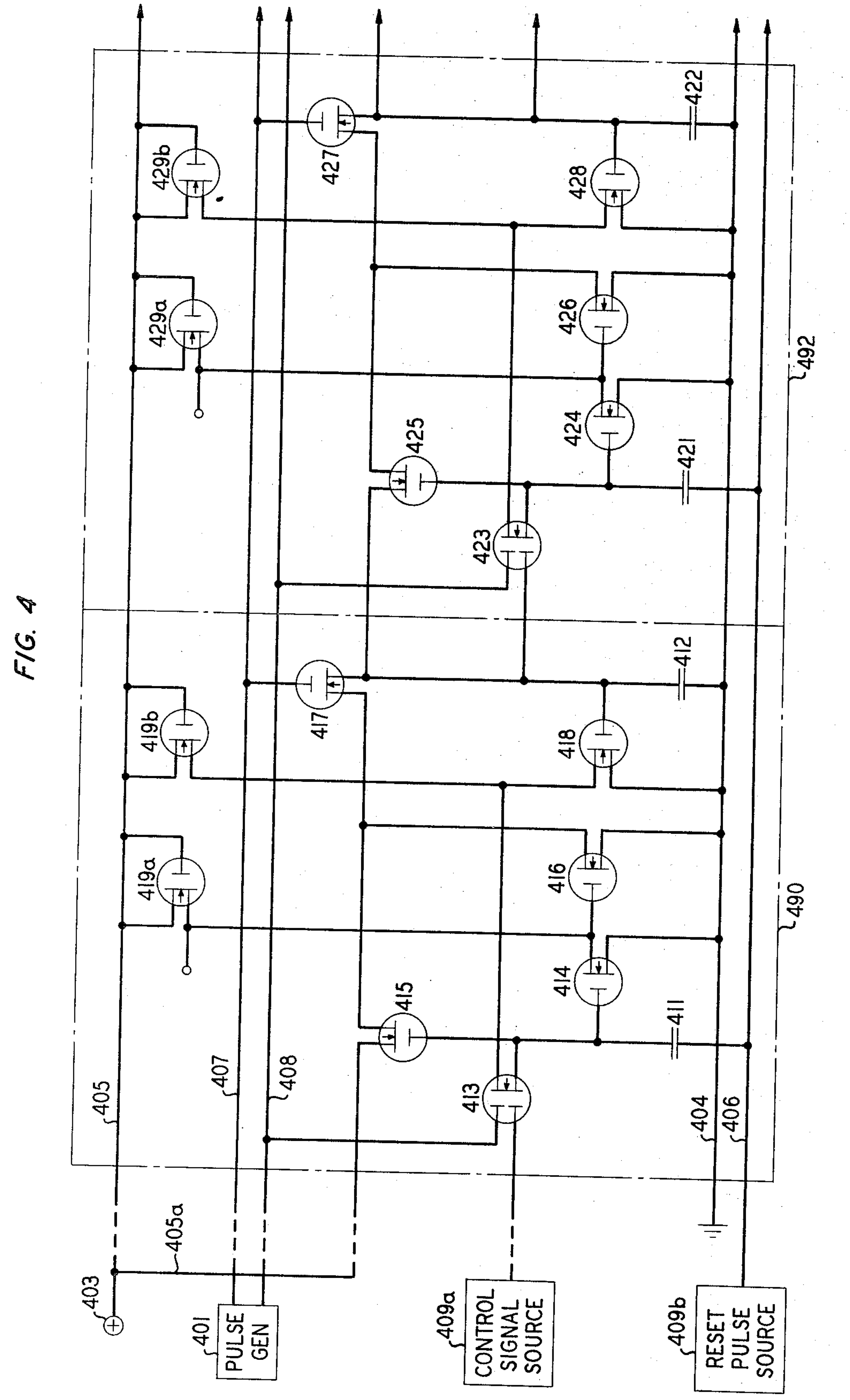
FIG. 4 depicts another multistage counter illustrative of the invention.

The two stage counter arrangement of FIG. 4 is substantially the same as that described with respect to FIG. 3 except that the resetting of each stage to an initial state is accomplished through the first storage device of each state. In FIG. 4, each stage second storage device such as storage capacitor 412 or 422 is connected to ground reference potential via lead 404. Each stage first storage device such as 411 or 421 is connected via reset lead 406 to reset pulse source 409b. FIG. 8 shows the waveforms useful in describing the operation of the counter circuit of FIG. 4.

In FIG. 8, the voltages across capacitors 411, 412, 421 and 422 are shown in waveforms 803, 805, 807 and 809 respectively. Waveform 802 shows the output of pulse generator 401 applied to lead 407 and waveform 801 shows the output of generator 401 applied to lead 408. When the pulse on lead 407 is positive, a reset pulse is applied to capacitors 411 and 421 from pulse source 409b via lead 406. The positive reset pulse passes through capacitors 411 and 421 and causes IGFETs 415 and 425 to conduct. The positive output on lead 407 causes IGFETs 417 and 427 to conduct whereby second storage capacitor 412 is charged to its one state from positive voltage source 4403 through IGFETs 415 and 417 and capacitor 422 is charged to its one state through IGFETs 415, 417, 425 and 427. When the voltage on lead 407 becomes low, the voltage on lead 408 is high. Responsive to the positive voltage on lead 408 and a positive control signal from source 409a, IGFET 413 conducts. IGFET 418 is also conductive responsive to the high positive voltage across capacitor 412 so that capacitor 411 is discharged to ground reference potential through series connected conducting IGFETs 413 and 418. IGFET 423 is conductive responsive to the positive output on lead 408 and the high voltage across capacitor 412. IGFET 428 is conductive responsive to the high positive voltage across capacitor 422 whereby a conductive path is established from capacitor 421 via IGFETs 423 and 428 to ground reference potential so that capacitor 421 is discharged to ground reference potential. In all other respects, the operation of the counter stages of FIG. 4 is substantially the same as described with respect to FIG. 3.

Figure 5:
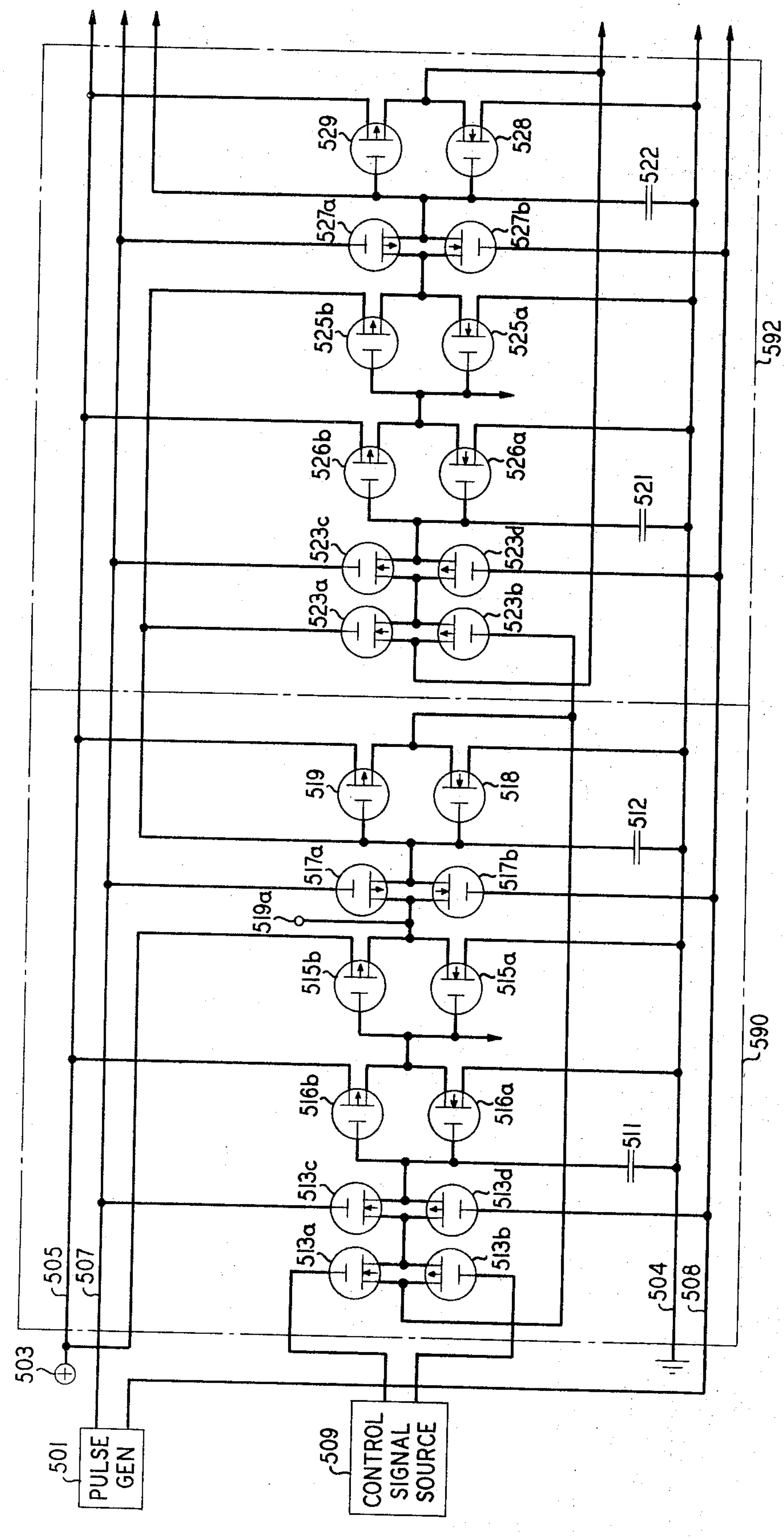
FIG. 5 depicts another multistage counter ilustrative of the invention.

FIG. 5 illustrates the operation of another embodiment of the invention wherein each switch includes both a p-type and an n-type IGFET. IGFETs **513*a* and 513*b* for example are arranged so that the drain-source path of n-type IGFET 513*a* is connected parallel to the drain source path of p-type IGFET 513*b*. Since IGFET 513*a* is an n-type, a high positive signal is applied to its gate electrode while a low signal is applied to the gate of p-type IGFET 513*b*. IGFETs 513*a* and 513*b* then conduct at the same time so that two conductive paths are established therethrough. Advantageously, the conductivity of the parallel source-drain paths is relatively high regardless of the magnitude or polarity of the signal applied across their drain source paths. IGFETs 513*c* and 513*d* as well as 517*a* and 517*b* also form transmission gate pairs in stage 590. IGFETs 523*a* and 523*b*, 523*c* and 523*d*, and 527*a* and 527*b* provide the same type of transmission gate structures in stage 592.**

The drain-source paths of IGFETs **516*a* and 516*b* are connected in series while the gates of these IGFETs are connected together. In this way, a high conductance path is provided through the source-drain path of IGFET 516*a* responsive to a high positive voltage applied to the gate of IGFET 516*a* while IGFET 516*b* is nonconductive. In response to a low positive voltage, IGFET 516*a* is nonconductive while a high conductivity path is provided through the source-drain path of IGFET 516*b*.**

Assume for purposes of illustration that storage capacitors 511 and 512 of stage 590 and storage capacitors 521 and 522 of stage 592 are in their low voltage states at time t1 shown in FIG. 8. The voltage waveforms across capacitors 511, 512, 521 and 522 are shown in waveforms 803, 805, 807 and 809 respectively. Assume further that a positive voltage is applied to the gate of IGFET **513*a* from control signal source 509 and that a low voltage is applied to the gate of IGFET 513*b* from signal source 509. Under these conditions, n-type IGFET 513*a* and p-type IGFET 513*b* are rendered conductive. The output of pulse generator 501 on lead 507 is shown in waveform 801 and the output of pulse generator 501 on lead 508 is shown in waveform 802. Between times t1 and t2, the low voltage on lead 507 causes n-type IGFET 513*c* to be nonconductive and the high voltage on lead 508 causes IGFET 513*d* to be nonconductive so that storage capacitor 511 remains in the low voltage state. IGFETs 517*a* and 517*b* conduct responsive to the voltages on leads 507 and 508. IGFETs 516*b* and 515*a* are also conductive since capacitor 511 is in its low voltage state. The complement of the state of capacitor 511 can be obtained from terminal 519*a*. Capacitor 512 is connected to ground reference potential through IGFETs 517*a* and 517*b* and IGFET 515*a*, and capacitor 512 remains in its low voltage state. In stage 592 between times t1 and t2, IGFET 523*a* is nonconductive since capacitor 512 is in its low voltage state and p-type IGFET 519 is conductive. This places a high positive voltage on the gate of p-type IGFET 523*b* which is nonconductive. Thus, capacitor 521 remains in its low voltage state (waveform 807). P-type IGFET 527*a* is conductive since the voltage on lead 507 is low between times t1 and t2 and n-type IGFET 527*b* is conductive responsive to the high voltage output from generator 501 on lead 508. IGFETs 526*b* and 525*a* are conductive reference to the low voltage state of capacitor 521 whereby capacitor 522 is connected to ground reference potential through IGFETs 527*a* and 527*b* and IGFET 525a whereby capacitor 522 remains in its low voltage state (waveform 809). Stages 590 and 592** are both in their zero states.

At time t2 in FIG. 8, p-type IGFETs 519 and **513*b* and n-type IGFET 513*a* in stage 590 remain conductive. IGFETs 513c and 513*d* become conductive due to the changes in the outputs of generator 501 on leads 507 and 508 as shown on waveforms 801 and 802, respectively. A conductive path is established from positive voltage source 503 through IGFET 519, IGFET pair 513*a* and 513*b* and IGFET pair 513*c* and 513*d* to capacitor 511 so that capacitor 511 is charged to its high voltage state. In stage 592, IGFETs 523*a* and 523*b* remain nonconductive because capacitor 512 is in its low state so that capacitor 521 remains in its low voltage state. Stage 590 is thus in its one state and stage 592** is in its zero state.

At time t3, the voltage on lead 507 becomes low (waveform 801) and the voltage on lead 508 becomes high (waveform 802) so that IGFETs **517*a* and 517*b* conduct. Since capacitor 511 in stage 590 is in its high voltage state, IGFETs 516*a* and 515*b* conduct whereby a conductive path is established from positive voltage soource 503 through IGFET 515*b* and IGFET pair 517*a* and 517*b* to charge capacitor 512 to its high voltage state. In state 592, capacitor 521 is in its low voltage state, so that IGFETs 526*b* and 525*a* are rendered conductive. A path is then established from capacitor 522 through IGFET pair 527*a* and 527*b* and IGFET 525*a* to ground reference potential whereby capacitor 522** remains in its low voltage state.

At time t4, the output of pulse generator 501 on lead 507 (waveform 801) is high and the output on lead 508 (waveform 802) is low so that IGFET pair **517*a* and 517*b* as well as IGFET pair 527*a* and 527*b* become nonconducting while IGFET pair 513*c* and 513*d* as well as IGFET pair 523*c* and 523*d* are rendered conductive. In stage 590, IGFETs 513*a* and 513*b* are conductive responsive to the outputs of source 509 and IGFET 518 is conductive responsive to the high voltage state of capacitor 512. In this way, a conductive path is established from storage capacitor 511 through IGFET pair 513*c* and 513*d*, IGFET pair 513*a* and 513*b* and 518 to ground reference potential. Capacitor 511** is then discharged through this conductive path.

In stage 592 at time t4, IGFET **523*a* is conductive responsive to the high voltage state of capacitor 512 and IGFET 523*b* is conductive since IGFET 518 connects the gate of IGFET 523*b* to ground reference potential. But capacitor 522 is in its low voltage state so that p-type IGFET 529 is conductive and n-type IGFET 528** is nonconductive. In this way, a path is established from positive voltage source 503 through IGFET 529, IGFET pair 523*a* and 523*b* and IGFET pair 523*c* and 523*d* to capacitor 521 whereby capacitor 521 is charged to its high voltage state. Counter stage 590 is then in its zero state while counter stage 592 is in its one state.

At time t5, IGFET pair 517*a* and 517*b* becomes conductive responsive to the voltages on leads 507 and 508 and IGFETs 516*b* and 515*a* are conductive responsive to the low voltage output on capacitor 511 so that capacitor 512 is discharged to ground reference potential through the path including IGFET pair 517*a* and 517*b* and IGFET 515*a*. IGFETs 526*a* and 525*b* conduct responsive to the high voltage state of capacitor 521. Capacitor 522 remains in its low voltage state since it is connected to ground reference potential through IGFET pair 527*a* and 527*b*, IGFET 525*b*, IGFET pair 517*a* and 517*b* and IGFET 515*a*.

At time t6, pulse generator 501 provides a high positive signal on lead 507 and low signal on lead 508 so that IGFET pair 513*c* and 513*d* as well as IGFET pair 523*c* and 523*d* are conductive while IGFET pair 517*a* and 517*b* and IGFET pair 527*a* and 527*b* are nonconductive. In stage 590, p-type IGFET 519 is conductive responsive to the low voltage on capacitor 512 whereby capacitor 511 is charged to its high voltage state from positive voltage source 503 through IGFET 519, IGFET pair 513*a* and 513*b* and IGFET pair 513*c* and 513*d*. No change occurs in stage 592 since the low voltage across capacitor 512 prevents IGFET 523a from conducting The high positive voltage from p-type IGFET 519 prevents IGFET 523b from conducting. Just after this time, counter stages 590 and 592 are in their one states.

At time t7, capacitor 512 is charged to its high state from positive voltage source 503 through IGFET 515b and IGFET pair 517*a* and 517*b*. IGFETs 516*a* and 515*b* conduct responsive to the high voltage across capacitor 511 and IGFET pair 517*a* and 517*b* conducts responsive to the voltages on leads 507 and 508. In stage 592, IGFETs 526*a* and 525*b* are conductive responsive to the high voltage on capacitor 521. IGFETs 527*a* and 527*b* are conductive responsive to the voltages on leads 507 and 508. Thus a path is established from positive voltage source 503 through IGFET 515*b*, IGFET pair 517*a* and 517*b*, IGFET 525*b* and IGFET pair 527*a* and 527*b* to capacitor 522. In this way, capacitor 522 is charged to its high voltage state.

At time t8, IGFET pair 513a and 513b is conductive, IGFET pair 513*c* and 513*d* is conductive responsive to the voltages from pulse generator 501 and IGFET 518 is conductive responsive to the high voltage across capacitor 512. Capacitor 511 is then discharged to ground reference potential through the path including IGFET pair 513*c* and 513*d*, IGFET pair 513*a* and 513*b* and IGFET 518. In stage 592, IGFET 523*a* is conductive responsive to the high voltage on capacitor 512 and IGFET 523*b* is conductive since IGFET 518 conducts and connects the gate of IGFET 523*b* to ground reference potential responsive to the high voltage on capacitor 512. IGFET pair 523*c* and 523*d* conduct as a result of the voltages on leads 507 and 508 and IGFET 528 is conductive in response to the high voltage state of capacitor 522. A path is then established to discharge capacitor 521 through IGFET pair 523*c* and 523*d*, IGFET pair 523*a* and 523*b* and IGFET 528.

Counter stages 590 and 592 are then returned to their zero states.

Since the outputs on capacitors 511 and 521 are low at time t9, IGFETs 516*b* and 515*a* are conductive and IGFETs 526*b* and 525*a* are also conductive. In response to the voltages on leads 507 and 508, IGFET pair 517*a* and 517*b* as well as IGFET pair 527*a* and 527*b* conduct. Thus, capacitor 512 is discharged to ground reference potential through IGFET pair 517*a* and 517*b* annd IGFET 515a and capacitor 522 is discharged to ground reference potential through IGFET pair 527*a* and 527*b* and IGFET 525a. While only a two stage counter has been described with respect to FIG. 5, it is readily seen that any number of stages can be utilized in accordance with the principles of the invention.

Figure 6:
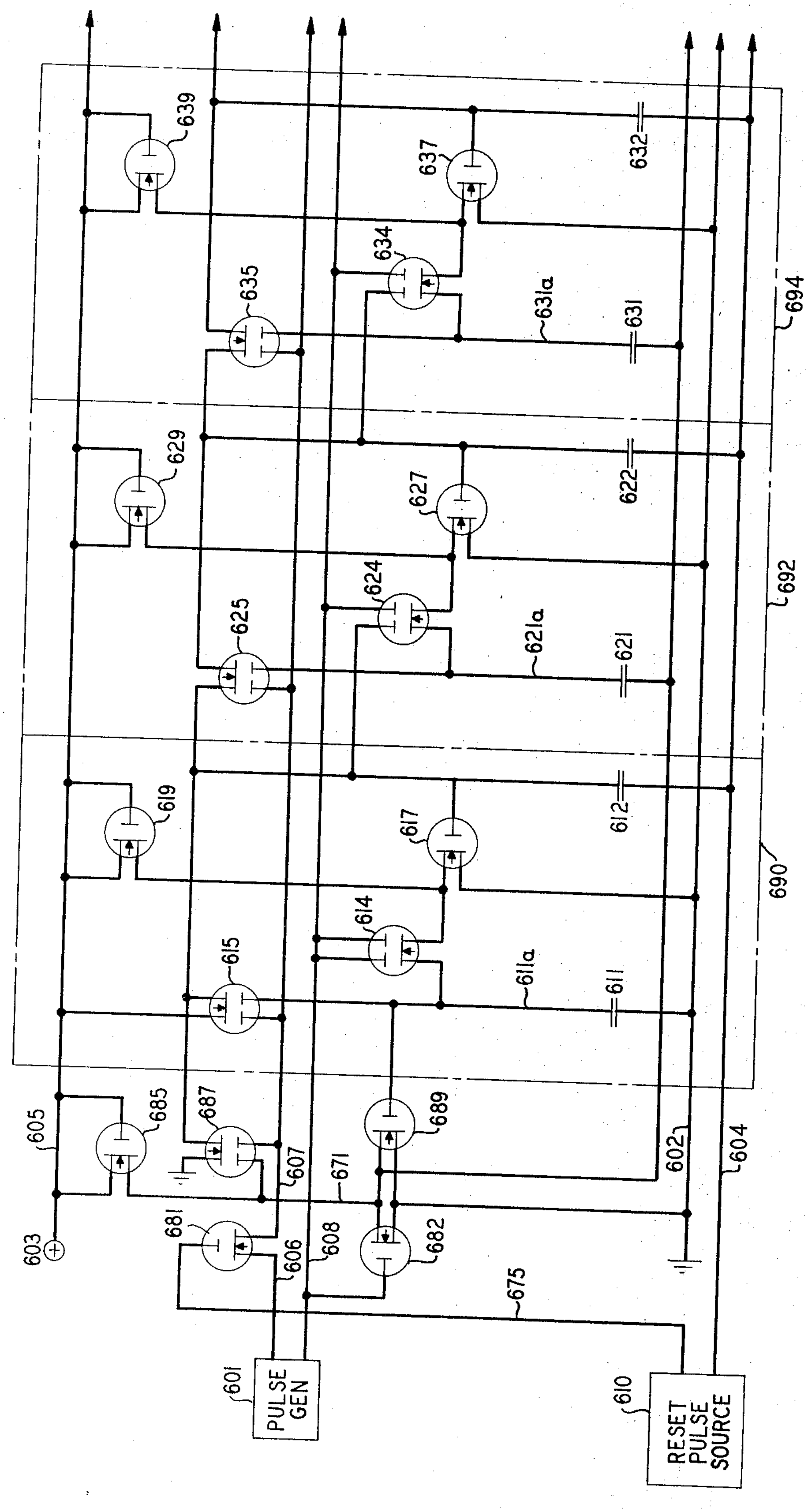
FIG. 6 depicts another multistage counter illustrative of the invention.
Figure 9:
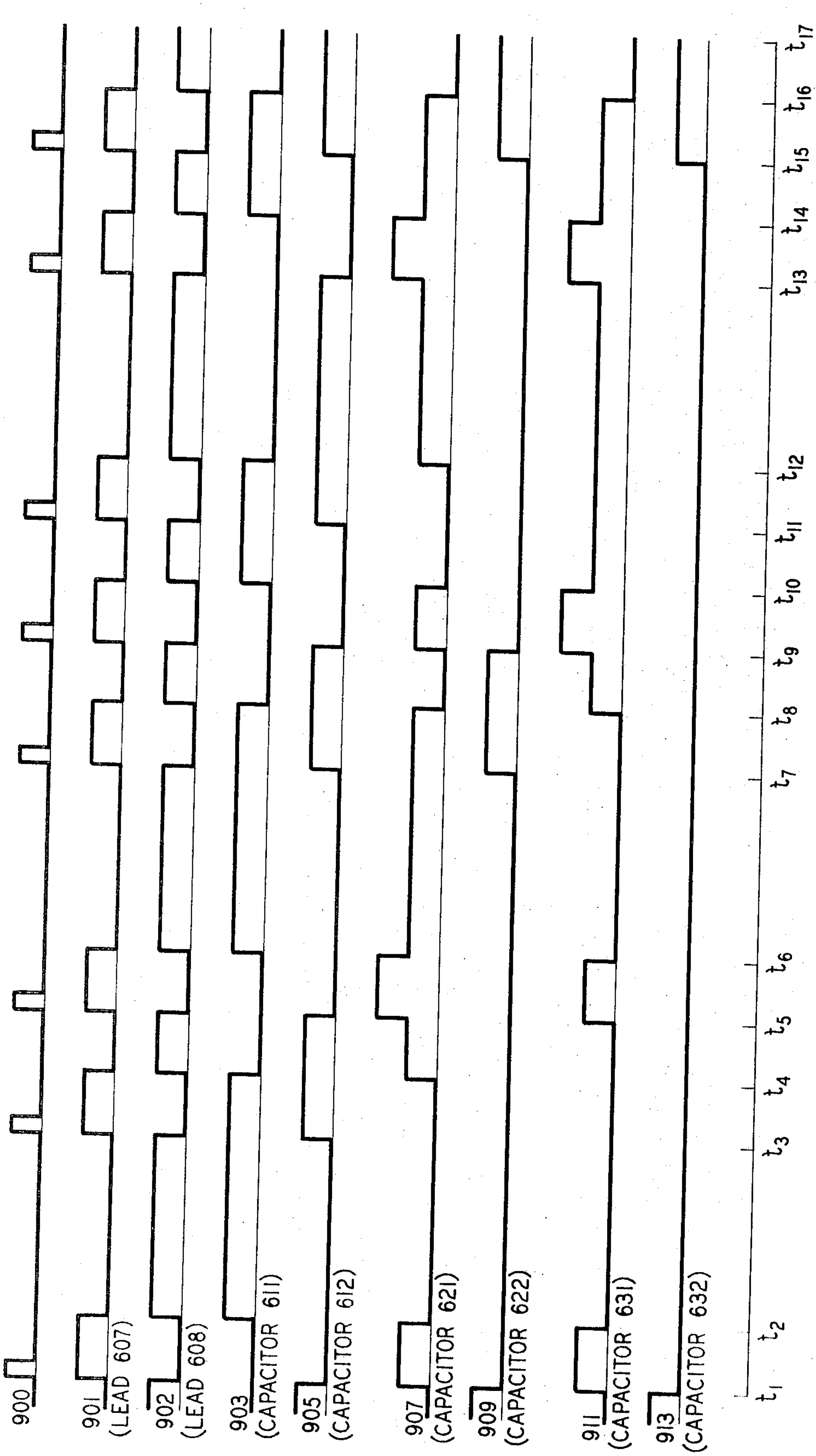
FIG. 9 shows waveforms useful in describing the multistage counter depicted in FIG. 6.

FIG. 6 shows a schematic diagram of a three stage binary counter illustrative of the invention. In FIG. 6, stage 690 includes storage capacitors 611, 612 and IGFET switches 614, 615 and 617 and IGFET resistive device 619. Stage 692 includes storage capacitors 621 and 622 and IGFET switches 624, 625 and 627 and IGFET resistive device 629. Stage 694 includes storage capacitors 631 and 632 and IGFET switches 634, 635, and 637 and IGFET resistive device 639. The voltage to charge the storage capacitors of stages 690, 692 and 694 is supplied by positive voltage source 603 and pulse generator 601 is operative on the occurrence of each pulse to be counted to provide a positive going pulse on lead 606 as shown in waveform 901 of FIG. 9 and a negative going pulse on lead 608 as shown in waveform 902. Reset pulse source 610 is connected to each stage via lead 604 and to the gate of IGFET switch 681 to reset the counter to an initial state.

Assume for purposes of illustration that each of capacitors 611, 612, 621, 622, 631 and 632 is in its low voltage state as shown on waveforms 903, 905, 907, 909, 911 and 913 respectively, at time t1. At time t1, the output of generator 601 on lead 606 (waveform 901) is a high positive voltage and the output of lead 608 is low (waveform 902). IGFETs 614, 624 and 634 are nonconductive responsive to the low output on lead 608 so that capacitors 611, 621 and 631 remain in their low voltage states between times t1 and t2. IGFET 689 is nonconductive responsive to the low voltage on lead 611*a* whereby a relatively high voltage is applied from source 603 IGFET resistive device 685, and lead 671 through capacitor 621 to one gate of IGFET 625. This high voltage is shown on waveform 907. Similarly, a high voltage is applied from the same source to one gate of IGFET 635 and this high voltage is shown on waveform 911. A high positive voltage is also applied to one gate of IGFET 687 from IGFET resistive device 685. The other gate of IGFET 687 receives a high positive voltage from pulse generator 601 via normally conducting IGFET 681 and lead 607 so that IGFET 687 is rendered conductive. Each of IGFETs 625 and 635 is also conductive at this time responsive to the high positive voltage from lead 607 on one gate and the high voltage from one of leads 621*a* and 631*a* on the other gate thereof. In this way, a conductive path is established from capacitor 622 via IGFETs 625 and 687 to ground reference potential so that capacitor 622 remains in its low voltage state. A conductive path is also established from capacitor 632 via IGFETs 635, 625, and 687 so that capacitor 632 remains in its low voltage state.

At time t2, IGFETs 615, 625, 635 and 687 become nonconductive responsive to the low voltage on lead 607. IGFET 614 becomes conductive responsive to the high positive voltage on the gates of 614 from lead 608. Since capacitor 612 is in its low voltage state, IGFET 617 is nonconductive and a conductive path is established from positive voltage source 603 via IGFET resistor 619 and IGFET 614 to capacitor 611. In this way, capacitor 611 is placed in its high voltage state as indicated in waveform 903. In stage 692, IGFET 624 remains nonconductive since capacitor 612 is in its low voltage state. Similarly, IGFET 634 in stage 694 is nonconductive responsive to the low voltage on capacitor 622. Thus capacitors 621 and 631 remain in their low voltage states as indicated in waveforms 907 and 911, respectively. Just after time t2, counter stage 690 is in its one state and counter stages 692 and 694 are in their zero states.

The next pulse to be counted is applied at time t3 (waveform 900). At this time, IGFETs 614, 624 and 634 are nonconductive because of the low voltage from pulse generator 601 on lead 608 (waveform 902) and the states of capacitors 611, 621 and 631 are unaltered. IGFETs 625 and 635 are nonconductive since the voltage on each of leads 621a and 631a is low. But IGFET 615 is rendered conductive responsive to the high voltage on lead 607 (waveform 901) and the high voltage state of capacitor 611. IGFET 687 is nonconductive since IGFET 689 conducts in response to the high voltage state of capacitor 611. The conduction of IGFET 689 causes its drain electrode to draw current through resistive device 685 whereby a low voltage is applied to one gate of IGFET 687. Thus, a conductive path is established from positive voltage source 603 through lead 605 and IGFET 615 to capacitor 612 whereby capacitor 612 is charged to its high voltage state. This is indicated on waveform 905.

At time t4, IGFET 615 is rendered nonconductive by the low voltage on lead 607 (waveform 901) and IGFET 614 is rendered conductive responsive to the high positive voltage on lead 608 (waveform 902) from generator 601. IGFET 624 is rendered conductive responsive to the high positive voltage on lead 608 and the high voltage state of capacitor 612. Since IGFET 617 is conductive responsive to the high voltage state of capacitor (waveform 905), capacitor 611 is discharged through conducting IGFETs 614 and 617. Capacitor 622 is in its low voltage state (waveform 909) whereby IGFET 627 is nonconductive and capacitor 621 is charged to its high voltage state from positive voltage source 603 through IGFET resistor 629 and IGFET 624. Because capacitor 622 is in its low voltage state, IGFET 634 is nonconductive and capacitor 631 remains in its low voltage state. At this time, stage 690 is in its zero state, stage 692 is in its one state and stage 694 is in its zero state.

The next pulse to be counted occurs at time t5 (waveform 900). Responsive to the high voltage on lead 607 and the high voltage on lead 671 at this time, IGFET 687 becomes conductive so that capacitor 612 is discharged through IGFET 687 to ground reference potential. Between time t5 and t6, the voltage from lead 671 remains high because capacitor 611 is in its low voltage state (waveform 903). This high voltage is applied through capacitors 621 and 631 to leads 621a and 631a so that the output voltage on lead 621_a_ (waveform 907) is made more positive and the output voltage on 631_a_ (waveform 911) is made positive. The positive voltages on leads 621_a_ and 631_a_ and the high voltage output on lead 607 causes both IGFETs 625 and 635 to conduct whereby capacitors 622 and 632 are connected to ground reference potential via IGFETs 635, 625 and 687. These capacitors remain in their low voltage states.

At time t6, IGFET 614 is rendered conductive responsive to the high positive voltage on lead 608 but IGFET 617 is nonconductive since capacitor 612 is in its low voltage state (waveform 905). Consequently, capacitor 611 is charged to its high voltage state (waveform 903) from positive voltage source 603 via IGFET resistor 619 and IGFET 614. The low voltage state of capacitor 612 prevents IGFET 624 from conducting so that capacitor 621 remains in its high voltage state (waveform 907). Similarly, the low voltage state of capacitor 622 prevents IGFET 634 from conducting and capacitor 631 remains in its low voltage state (waveform 911). At this time, counter stages 690 and 692 are in their one states and counter stage 694 is in its zero state.

The state of the counter remains unaltered until time t7 when the next pulse to be counted occurs. At time t7, IGFETs 615 and 625 become conductive responsive to the high positive voltage on lead 607 from generator 601 and the high voltage states of capacitors 611 and 621. Since capacitor 611 is in its high voltage state, IGFET 689 is conductive, a low voltage appears on lead 671 whereby IGFET 687 is nonconducting. Thus, at this time, a conductive path is established from positive voltage source 603 through IGFET 615 to charge capacitor 612. Capacitor 622 is also charged from positive voltage source 603 through the path including IGFETs 615 and 625. The output voltages on capacitors 612 and 622 are shown in waveforms 905 and 909. Capacitor 632 remains in its low voltage state since IGFET 635 is nonconductive responsive to the low voltage state of capacitor 631. At time t8, IGFETs 615 and 625 are rendered nonconductive because of the low voltage output from generator 601 on lead 607 (waveform 901). IGFET 614 is conductive responsive to the high positive voltage on lead 608 (waveform 902). Since capacitor 612 is in its high voltage state, IGFET 617 is conductive and capacitor 611 is discharged to its low voltage state through IGFETs 614 and 617.

In stage 692, capacitor 622 is in its high voltage state so that IGFET 627 is conductive. Since capacitor 612 is in its high voltage state, IGFET 624 is also conductive and capacitor 621 is discharged to its low voltage state through IGFETs 624 and 627. In stage 694, IGFET 634 is conductive responsive to the high positive voltage on lead 608 and the high voltage state of capacitor 622, but IGFET 637 is nonconductive since capacitor 632 is in its low voltage state. Thus, capacitor 631 is charged to its high voltage state (waveform 911) through IGFET resistor 639 and IGFET 634. Counter stages 690 and 692 are in their zero states and counter stage 694 is in its one state.

IGFETs 614, 624 and 634 become nonconductive at t9 responsive to the low voltage on lead 608 (waveform 902). Since storage capacitor 611 is in its low state, IGFET 689 is nonconductive and the voltage on lead 671 becomes high. This high voltage is transferred to leads 621_a_ and 631_a_ between times t9 and t10 as shown on waveforms 907 and 911. Since the output of pulse generator 601 on lead 607 is high between times t9 and t10, IGFETs 625 and 635 are both conductive. The high voltage on lead 671 and the high voltage on lead 607 causes IGFET 687 to be rendered conductive. Thus a conductive path is established from capacitor 622 through IGFETs 625 and 687 to ground reference potential. Capacitor 632 is connected to ground reference potential through IGFETs 635, 625 and 687; and capacitor 612 is connected to ground reference potential through IGFET 687. In this way, capacitors 612 and 622 are discharged through their low voltage stages and capacitor 632 remains in its low voltage state.

At time t10, the voltage on lead 608 (waveform 902) becomes high causing IGFET 682 to conduct whereby the voltage on lead 671 goes low. The voltage on lead 621*a* then returns to the low condition and the voltage on lead 631*a* remains high. Because the voltage on lead 608 is high, IGFET 614 conducts. IGFET 617 is nonconductive due to the low voltage stage of capacitor 612 and a charging path is established from positive voltage source 603 through IGFET resistor 619 and IGFET 614 to place capacitor 611 in its high voltage state as indicated on waveform 903 at time t10. Counter stages 690 and 694 are in their one states and counter stage 692 is in its zero state.

In response to the next pulse to be counted at time t11, the voltage on lead 607 becomes high and the voltage on lead 608 becomes low. IGFET 615 conducts jointly responsive to the high voltage on lead 607 and capacitor 611 being in its high state. IGFET 687 is nonconductive because capacitor 611 is in its high voltage state and a conductive path is established from source 603 through IGFET 615 to charge capacitor 612 to its high voltage state. Since capacitor 621 is in its low voltage state at time t11, IGFET 625 is nonconductive and capacitor 622 remains uncharged. Although IGFET 635 is conductive responsive to the high positive voltage on lead 607 and the high state voltage of capacitor 631, capacitor 632 remains unchanged because IGFET 625 is nonconductive.

At time t12, the voltage on lead 608 becomes positive and the voltage on lead 607 goes low so that IGFETs 615, 625, and 635 become nonconductive and IGFET 614 is rendered conductive. IGFET 617 is conductive because capacitor 612 is in its high voltage state and capacitor 611 is discharged to ground reference potential through IGFETs 614 and 617. In stage 692, IGFET 624 is conductive responsive to the high voltage state of capacitor 612 and the high voltage on lead 608; but IGFET 627 is nonconductive since capacitor 622 is in its low voltage state. Therefore a conductive path is established from source 603 through IGFET resistor 629 and IGFET 624 to charge capacitor 621 to its high voltage state as indicated on waveform 907. Since capacitor 622 is in its low voltage state, IGFET 634 in stage 694 remains nonconductive and capacitor 631 remains in its high voltage state. Counter stages 690 is in its zero state and counter stages 692 and 694 are in their one states.

The next pulse to be counted occurs at time t13. At this time, pulse generator 601 provides a high voltage on lead 607 and a low voltage on lead 608 as indicated on waveforms 901 and 902 respectively. Capacitor 611 is in its low voltage state and the voltage on lead 671 becomes high. Thus IGFET 687 conducts and provides an additional high voltage on leads 621*a* and 631*a*. IGFETs 625 and 635 become conductive responsive to the high voltage on lead 607 and the high voltages on leads 621*a* and 631*a* so that capacitors 622 and 632 are connected to ground reference potential. These capacitors then remain in their low voltage states. At time t14, IGFET 614 is rendered conductive by the high voltage on lead 608. But IGFETs 624 and 634 remain nonconductive because capacitors 612 and 622 are in their low voltage states. At this time, only capacitor 611 is charged to its high voltage state through IGFET resistor 619 and IGFET 614. Stages 690, 692 and 694 are in their one states.

At time t15, the next input pulse occurs and the voltage on lead 607 becomes high while the voltage on lead 608 becomes low. IGFET 687 is nonconductive since capacitor 611 is in its high voltage state. But IGFETs 615, 625 and 635 are rendered conductive responsive to the high voltage on lead 607 and the high voltage states on capacitors 611, 621 and 631. Capacitor 612 is then charged to its high voltage state from source 603 through IGFET 615; capacitor 622 is charged to its high voltage state from source 603 through IGFETs 615 and 625; and capacitor 632 is charged to its high voltage state through IGFETs 615, 625 and 635. At time t16, the voltage on lead 607 becomes low while the voltage on lead 608 becomes high so that IGFETs 615, 625 and 635 are rendered nonconductive. IGFET 614 is rendered conductive by the high voltage on lead 608 and IGFET 617 conducts responsive to the high voltage on capacitor 612. Capacitor 611 is then discharged to its low voltage state through IGFETs 614 and 617. IGFET 624 becomes conductive at time t16 responsive to the high voltage on lead 608 and the high voltage state of capacitor 612. IGFET 627 is conductive because capacitor 622 is in its high voltage state and capacitor 621 is discharged to its low voltage state through IGFETs 624 and 627. IGFET 634 is conductive responsive to the high voltage state of capacitor 622 and the high positive voltage on lead 608 and IGFET 637 is conductive responsive to the high voltage state of capacitor 632. Capacitor 631 is then discharged to its low voltage state through IGFETs 634 and 637. Stages 690, 692 and 694 are returned to their zero states.

The counter shown in FIG. 6 may be reset to an initial state through the use of reset pulse source 610. The output of reset pulse source 610 on lead 675 is normally a high positive voltage and the output of lead 604 is normally low, e.g., ground reference potential. When it is desired to reset counter stages 690, 692 and 694 to an initial zero state, reset pulse source 610 provides a low voltage on lead 675 and a high voltage on lead 604 during a time interval when the output of pulse generator 601 on lead 607 is low such as occurs between times t6 and t7. The high voltage on lead 604 is coupled via capacitor 612 to the gate of IGFET 617, via capacitor 622 to the gate of IGFET 627, and via capacitor 632 to the gate of IGFET 637. IGFETs 617, 627 and 637 are then rendered conductive. During the reset pulse, the voltage on lead 608 (waveform 902) is high so that IGFET 614 is conducting. IGFET 624 is conductive responsive to the high voltage from capacitor 612 and the high voltage on lead 608; and IGFET 634 is conductive responsive to the high voltage from capacitor 622 and the high voltage on lead 608. In this way, capacitor 611 is discharged to its low voltage state through IGFETs 614 and 617; capacitor 621 is discharged to its low voltage state through IGFETs 624 and 627; and capacitor 631 is discharged to its low voltage state through IGFETs 634 and 637. Upon the occurrence of the next pulse to be counted, the voltage on lead 604 is low and the voltage on lead 675 is high. Since capacitor 611 is in its low voltage state, IGFET 689 is nonconductive and the voltage on lead 671 is high. Thus IGFET 687 is rendered conductive. IGFETs 625 and 635 become conductive responsive to the high voltage on lead 671 and the high voltage on lead 607. Capacitor 612 is then discharged through IGFET 687. Capacitor 622 is discharged through IGFETs 625 and 687; and capacitor 635 is discharged through IGFETs 635, 625 and 687. Thus at the termination of the first pulse to be counted, all the storage capacitors in the counter of FIG. 6 are in their low voltage states and the counter starts the counting operations from a zero condition.

Figure 7:
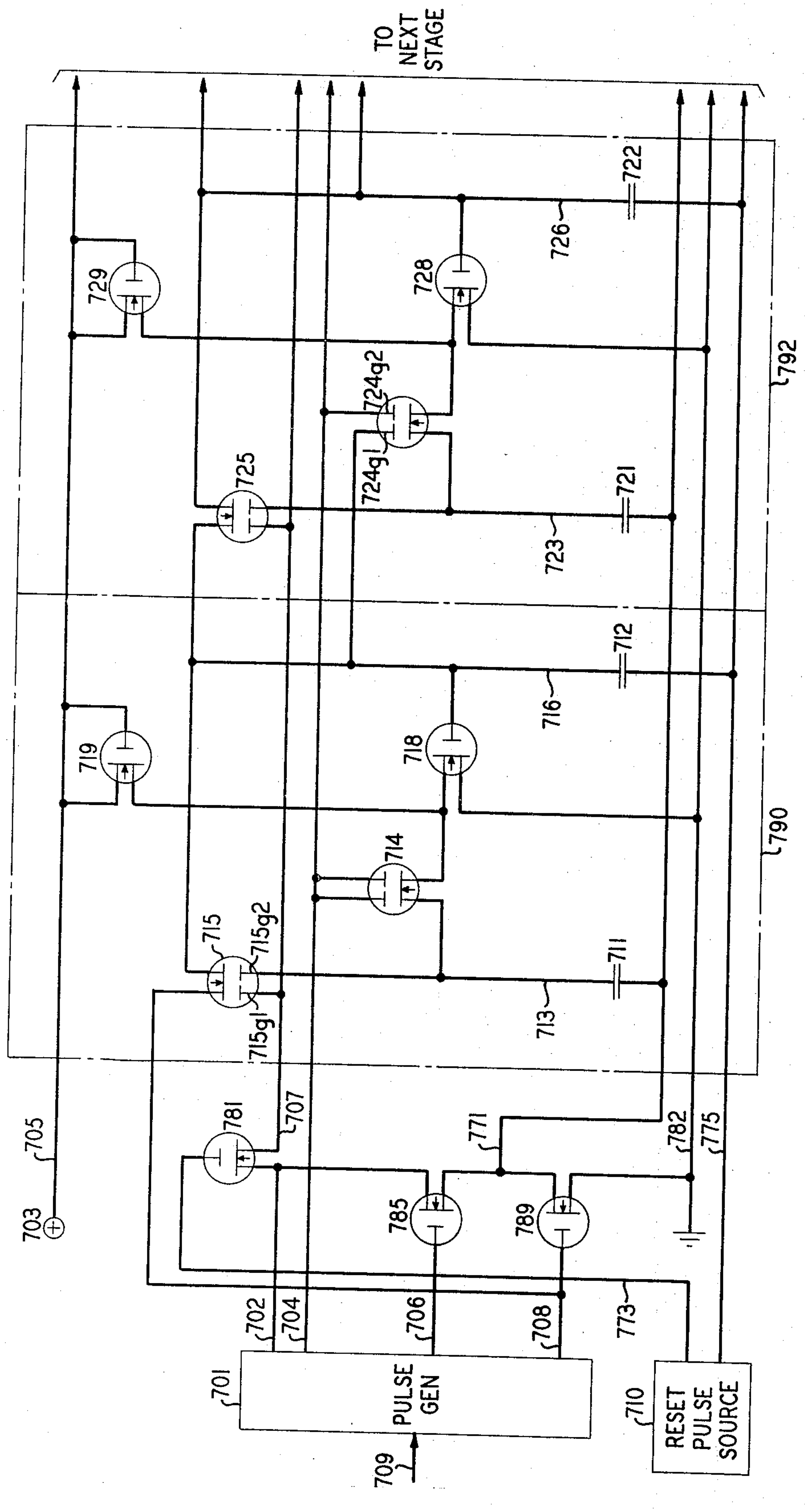
FIG. 7 depicts another multistage counter illustrative of the invention.

FIG. 7 shows a two stage binary counter illustrative of the invention including stages 790 and 792. Positive voltage source 703 provides a storage capacitor charging source. Pulse generator 701 provides timing pulse in response to the pulse to be counted applied to lead 709. Three successive pulses occur in response to each pulse to be counted. The pulse to be counted is shown in waveform 1000 on FIG. 10. The output of pulse generator 701 on lead 702 is shown on waveform 1001 and this output includes a first positive pulse and a second positive pulse responsive to each pulse to be counted. In response to the pulse to be counted occurring at t1, the first positive pulse on lead 702 occurs between times t1 and t2 and the second pulse on lead 702 occurs between times t3 and t4. The output of generator 701 on lead 704 is shown in waveform 1003. The pulse shown thereon occurring between times t2 and t3 is responsive to the input pulse occurring at time t1. The output of generator 701 on lead 706 is shown in waveform 1005 and the pulse shown thereon between times t3 and t4 occurs in response to the input pulse at time t1. The output from generator 701 on lead 708 is shown in waveform 1007 and this waveform is the complement of the waveform in waveform 1005. Reset pulse source 710 is operative to reset both stages of the counter of FIG. 7 to an initial state. Normally, the output of source 710 on lead 775 is at ground reference potential and the output of source 710 on lead 773 is a high positive voltage. The high positive voltage on lead 773 causes IGFET 781 to conduct so that least 702 is connected to lead 707.

Counter stage 790 comprises storage capacitors 711 and 712, IGFET resistive device 719 and IGFET switches 714, 715 and 718. IGFET switch 715 is used to charge or discharge capacitor 712. IGFET 714 is used to charge capacitor 711 to a high positive voltage through IGFET resistor 719 and to discharge capacitor 711 through IGFET 718. Stage 792 comprises storage capacitor 721 and 722, IGFET resistive device 729 and IGFET switches 724, 725 and 728. IGFET 725 is used to charge and discharge capacitor 722. IGFET 724 is used to charge capacitor 721 through IGFET resistor 729 and to discharge capacitor 721 through IGFET 728.

Figure 10:
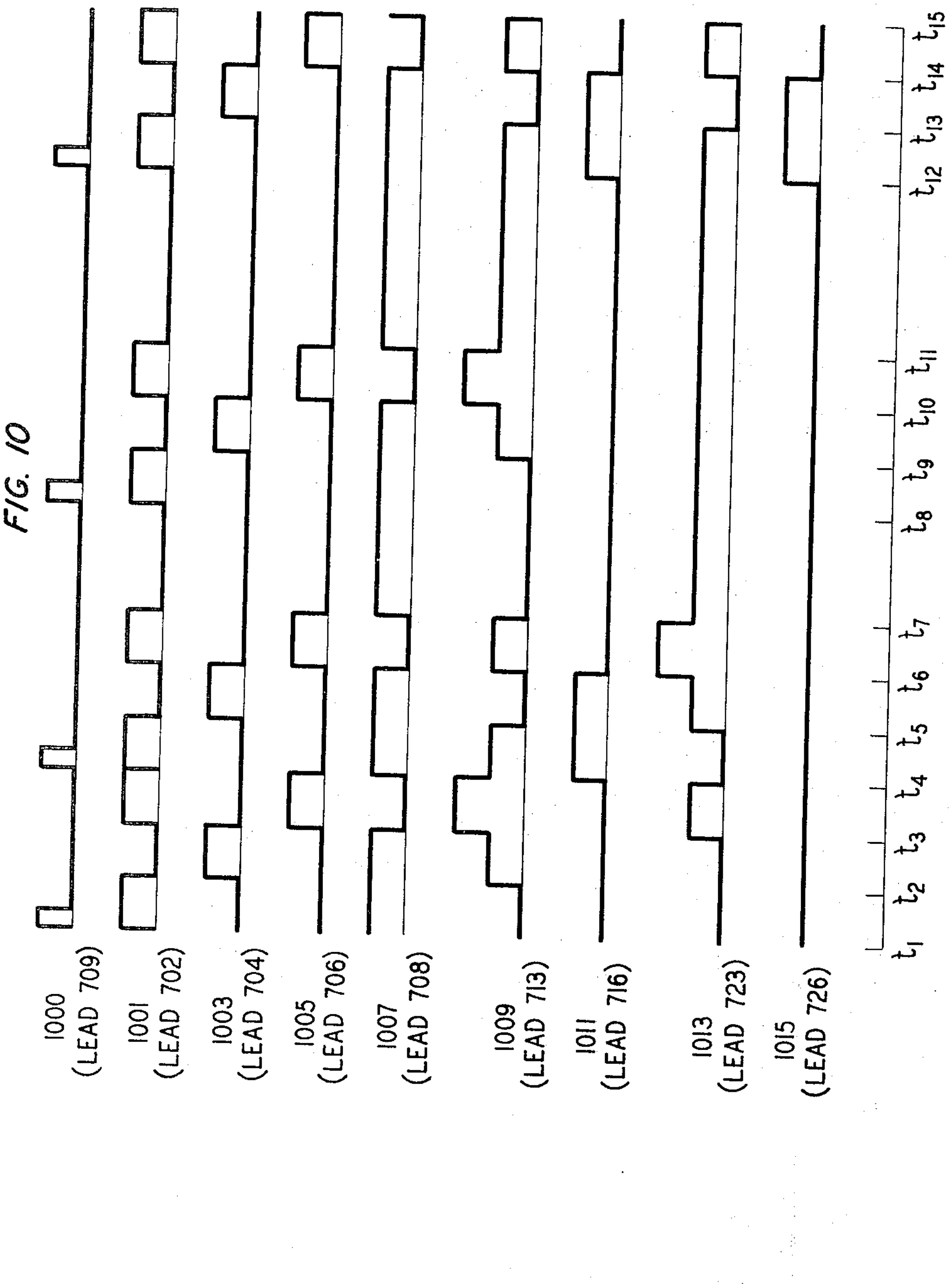
FIG. 10 shows waveforms useful in describing the multistage counter depicted in FIG. 7.

Assume for purposes of illustration that each of storage capacitors 711, 712, 721 and 722 is in its low voltage state at t1 on FIG. 10. The voltages on leads 713 from capacitor 711, 716 from capacitor 712, 723 from capacitor 721 and 726 from capacitor 722 are shown in waveforms 1009, 1011, 1013 and 1015, respectively. In response to the input pulse on lead 709 occurring at t1 (waveform 1000), the outputs on leads 702 and 708 are high while the outputs on leads 704 and 706 are low as shown in waveforms 1001, 1007, 1003 and 1005, respectively, between times t1 and t2. In stage 790, IGFET 715 is nonconductive since the voltage on lead 713 is low. Thus, capacitor 712 remains in its low voltage state. In stage 792, IGFET 725 is nonconductive since the voltage on lead 723 is low so that capacitor 722 remains in its low voltage state.

At time t2, the voltage on lead 702 (waveform 1001) becomes low, the voltage on lead 704 (waveform 1003) becomes high, the voltage on lead 706 (waveform 1005) remains low and the voltage on lead 708 (waveform 1007) remains high. IGFETs 715 and 725 remain nonconductive. IGFET 714 becomes conductive responsive to the high voltage on lead 704. Since capacitor 712 is in its low voltage state, IGFET 718 is nonconductive and capacitor 711 is charged from voltage source 703 through IGFET resistive device 719 and IGFET 714 to its high voltage state, as shown on waveform 1009. In stage 792, IGFET 724 is nonconductive because capacitor 712 is in its low voltage state and capacitor 721 remains in its low voltage state. Counter stage 790 is then in its one state and counter stage 792 is in its zero state.

At time t3, the voltage on lead 704 becomes low so that IGFET 714 is no longer conductive. The voltage on lead 706 becomes high as shown in waveform 1005 and the voltage on lead 703 becomes low as shown on waveform 1007. Thus, IGFET 785 is conductive and IGFET 789 is nonconductive. The high voltage on IGFET 785 is coupled through lead 771 and capacitors 711 and 721 to leads 713 and 723. IGFETs 715 and 725 conduct responsive to the high voltage on lead 707 and the high voltages on leads 713 and 723 and a conductive path is established from capacitor 712 to the low potential on lead 708 via IGFET 715 to maintain capacitor 712 in the low voltage state. Capacitor 722 is maintained in the low voltage state through IGFETs 725 and 715.

The next input pulse on lead 709 occurs at time t4. Pulse generator 701 then provides a high positive voltage on lead 702, a low voltage on lead 704, a low voltage on lead 706, and a high voltage on lead 708. The high voltage on lead 702 in conjunction with the high voltage on lead 713 from capacitor 711 causes IGFET 715 to conduct and the positive voltage from lead 708 is applied through IGFET 715 to charge capacitor 712 to the high voltage state. Since capacitor 721 is in its low voltage state, IGFET 725 is nonconductive and capacitor 722 remains in the low voltage state. At time t5, the voltage on lead 702 becomes low so that IGFETs 715 and 725 become nonconductive. The voltage on lead 704 becomes high whereby IGFET 714 is rendered conductive. Since capacitor 712 is in the high voltage state, IGFET 718 is conductive and capacitor 711 is discharged through IGFETs 714 and 718 to its low voltage state. In stage 792, the high voltage on lead 704 and the high voltage on capacitor 712 renders IGFET 724 conductive. IGFET 728 is nonconductive responsive to the low voltage state of capacitor 722 and a conductive path is established from voltage source 703 through IGFET resistive device 279 and IGFET 724 to charge capacitor 721 to its high voltage state. Counter stage 790 is in its zero state and counter stage 792 is in its one state. At time t6, the voltage on lead 704 becomes low so that IGFETs 714 and 724 are nonconductive. The voltage on lead 706 becomes high. IGFET 785 conducts and a high voltage from lead 702 is coupled through IGFET 785 and capacitors 711 and 712 to leads 713 and 723, respectively. The voltage on lead 702 is high so that IGFETs 715 and 725 are rendered conductive and a path is established from capacitor 712 through IGFET 715 to lead 708 whereby capacitor 712 is discharged to its low voltage state. Additionally, a conductive path is established from capacitor 722 through IGFETs 725 and 715 to lead 708 whereby capacitor 722 is maintained in its low voltage state.

The next input pulse occurs at time t8 and this pulse causes the voltages on leads 702 and 708 to be high and the voltages on leads 704 and 706 to be low. Since capacitor 711 is in its low voltage state, IGFET 715 is nonconductive and capacitors 712 and 722 remain in their low voltage states. At time t9, the voltages on leads 704 and 708 are high while the voltages on leads 702 and 706 are low. IGFET 714 conducts responsive to the high voltage on lead 704 but IGFET 718 is nonconductive since capacitor 712 is in its low voltage state. A conductive path is established from positive voltage source 703 through IGFET resistive device 719 and IGFET 714 to charge capacitor 711 to its high voltage state. IGFET 724 in stage 792 is nonconductive because capacitor 712 is at its low voltage state. Therefore, capacitor 721 remains in its high voltage state. Counter stages 790 and 792 are both in their zero state.

At time t10, the voltages on leads 702 and 706 become high while the voltages on leads 704 and 708 are low. Responsive to the high voltage on lead 702 and IGFET 785 being conductive, the voltage on lead 771 becomes high. This high voltage is coupled to leads 713 and 723 through capacitors 711 and 721 so that IGFETs 715 and 725 conduct providing discharge paths for capacitors 712 and 722 to the low voltage on lead 708. Capacitors 712 and 722 remain in their low voltage states.

The next input pulse occurs at time t12 and causes the voltages on leads 702 and 708 to be high while the voltages on leads 704 and 706 are low. In response to the high voltages on lead 702 and the high voltage states of capacitors 711 and 721, IGFETs 715 and 725 conduct and capacitors 712 and 722 are charged to their high voltage states responsive to the high voltage on lead 708. At time t13, the voltage on leads 704 and 708 are high while the voltages on leads 702 and 706 are low. Responsive to the high voltage on lead 704, IGFET 714 conducts. Capacitor 712 is in its high voltage state so that IGFET 718 conducts and capacitor 711 is discharged to its low voltage state through IGFETs 714 and 718. IGFET 724 is rendered conductive responsive to the high voltage state of capacitor 712 and the high voltage on lead 704. IGFET 728 is conductive responsive to the high voltage state of capacitor 722 and capacitor 721 is discharged to its low voltage state through IGFETs 724 and 728. Counter stages 790 and 792 are returned to their zero states.

At time t14, the voltages on leads 702 and 706 are high while the voltages on leads 704 and 708 are low. The high voltage on lead 702 is transmitted through now conducting IGFET 785 to lead 771 and therefrom through capacitors 711 and 721 to leads 712 and 723. IGFETs 715 and 725 become conductive and a conductive path is established from lead 708 through IGFETs 715 and 725 to discharge capacitors 712 and 722.

The counter of FIG. 7 may be reset to an initial condition through the operation of reset pulse source 710. Normally, the output on lead 773 is high while the output on lead 775 is low. In response to the occurrence of a reset pulse applied to reset source 710, the output on lead 773 becomes low and the output on lead 775 becomes high. The reset pulse occurs when the outputs on leads 704 and 708 are high and the outputs on leads 702 and 706 are low. When reset pulse source 710 is enabled, IGFET 781 becomes nonconductive and a high voltage is coupled through capacitors 712 and 722 to leads 716 and 726. In this way, IGFETs 718 and 728 are rendered conductive. IGFET 714 is conductive responsive to the high voltage on lead 704 and IGFET 724 is conductive responsive to the high voltage on lead 716 and the high voltage on lead 704. Thus, capacitor 711 is discharged through IGFETs 714 and 718 and capacitor 721 is discharged through capacitors 724 and 728. When the voltages on leads 704 and 708 become low and the voltages on leads 702 and 706 become high, IGFETs 781 and 785 conduct. A high voltage is applied to leads 713 and 723 through capacitors 711 and 721 and IGFETs 715 and 725 conduct. A path is then established from capacitors 712 and 722 through IGFETs 715 and 725 to lead 708 whereby capacitors 712 and 722 are discharged to their low voltage states.

What is claimed is:

1. A binary counter comprising a counting signal source, a first stage and a plurality of cascaded stages, the output of each stage being connected to the input of the immediately succeeding stage, the input of the first stage being connected to an energy source, means for simultaneously applying said counting signal to all stages, each cascaded stage comprising a first store operative in first and second opposite states, a second store connected to said stage output and operative in first and second opposite states, means jointly responsive to said counting signal and said stage first store being in its first state for connecting said stage input to said stage output to energize said stage second store to its first state from said energy source through all preceding stages when all preceding stage first stores are in their first states, means jointly responsive to said counting signal and said stage first store being in its second state for placing said stage second store in its second state, and means operative upon termination of said counting signal and responsive to the immediately preceding stage second store being in its first state for placing said stage first store in a state opposite to the state of said stage second store.

2. A binary counter circuit comprising a signal source, a charging voltage source, a reference voltage source, first and second storage capacitors each having first and second terminals and each operative in first and second states, each storage capacitor second terminal being connected to said reference voltage source, first switching means jointly responsive to said signal and said first storage capacitor being in its first state for charging said second storage capacitor to its first state, second switching means jointly responsive to said signal and said first storage capacitor being in its second state for putting said second storage capacitor in its second state, and apparatus operative upon termination of said signal comprising third switching means responsive to said second storage capacitor being in its first state for putting said first storage capcitor in its second state, and fourth switching means responsive to said second storage capacitor being in its second state for putting said first storage capacitor in its first state, said first switching means comprising first and second semiconductor devices each having first, second and control electrodes; said first semiconductor device first electrode being connected to said charging voltage source, said first semiconductor device second electrode being connected to said second semiconductor device first electrode, said first semiconductor device control electrode being directly connected to said first storage capacitor first terminal, said second semiconductor device second electrode being connected to said second storage capacitor first terminal, and said second semiconductor device control electrode being connected to said signal source.

3. A binary counter circuit according to claim 2 wherein said second switching means comprises a third semiconductor device having first, second and control electrodes, said third semiconductor device first electrode being connected to said second semiconductor device first electrode, said third semiconductor device second electrode being connected to said reference voltage source, and said third semiconductor device control electrode being connected to said first storage capacitor first terminal.

4. A binary counter circuit according to claim 3 wherein said third switching means comprises fourth and fifth semiconductor devices, each having first, second and control electrodes, said fourth semiconductor device first and control electrodes being connected to said voltage source, said fourth semiconductor device second electrode being connected to said fifth semiconductor device first electrode, said fifth semiconductor device second electrode being connected to said first storage capacitor first terminal, the control electrodes of said fifth semiconductor device being connected to said signal source.

5. A binary counter circuit according to claim 4 wherein said fourth switching means comprises a sixth semiconductor device having first, second and control electrodes, said sixth semiconductor device first electrode being connected to said fourth semiconductor second electrode and to said fifth semiconductor device first electrode, said sixth semiconductor device second electrode being connected to said reference potential source and said sixth semiconductor device control electrode being connected to said second storage capacitor first terminal.

6. A binary counter circuit according to claim 5 wherein each semiconductor device comprises an insulated gate field effect transistor having source, drain and gate electrodes, said drain electrode being said semiconductor device first terminal, said source electrode being said semiconductor device second electrode and said gate electrode being said semiconductor device control electrode.

7. A binary counter circuit comprising a counting signal source, a first stage and at least one cascaded stage each having an input and an output, the output of each stage being connected to the input of the immediately succeeding stage, the input of the first stage being connected to an energy source, each stage including first and second stores operative in first and second states, said second store being connected to said stage output, means jointly responsive to said signal and the first store of said stage being in its first state for connecting said stage input to said stage output for energizing said stage second store to its first state from said energy source through the preceding stages when all preceding stage first stores are in their first states, means responsive to said stage first store being in said second state for placing said stage second store in its second state, and each cascaded stage comprising apparatus operative upon termination of said signal comprising means responsive to the immediately preceding stage second store and said stage second store being in their first states for placing said stage first store in its second state and means responsive to the immediately preceding stage second store being in its first state and said stage second store being in its second state for placing said stage first store in its first state.

8. A binary counter comprising a signal source, a plurality of cascaded states, means for applying said signal from said source to all stages at the same time, each stage including first and second storage capacitors having first and second terminals and operative in first and second states, first switching means jointly responsive to said signal and the first storage capacitor of said stage and all preceding stages being in their first states for placing said second storage device of the stage in its first state, second switching means jointly responsive to said signal and the first storage capacitor of said stage being in its second state for placing said stage second storage capacitor in its second state, and apparatus operative upon termination of said signal comprising third switching means jointly responsive to the immediately preceding stage second storage capacitor being in its first state and said stage second storage capacitor being in its first state for placing said stage first storage capacitor in said second state, and fourth switching means jointly responsive to the immediately preceding stage second storage capacitor being in its first state and said stage second storage capacitor being in its second state for placing said stage first storage capacitor in its first state, and means for resetting each stage to an initial state including means for generating a reset signal, means for applying said reset signal to each second storage capacitor second terminal in the absence of said source signal, each fourth switching means being responsive to the reset signal applied to the second storage capacitor of its stage to unconditionally place the first storage capacitor of its stage in its second state.

9. A binary counter comprising a signal source, a plurality of cascaded stages, means for applying said signal from said source to all stages at the same time, each stage including first and second storage capacitors having first and second terminals and operative in first and second states, first switching means jointly responsive to said signal and the first storage capacitor of said stage and all preceding stages being in their first states for placing said second storage device of the stage in its first state, second switching means jointly responsive to said signal and the first storage capacitor of said stage being in its second state for placing said stage second storage capacitor in its second state, and apparatus operative upon termination of said signal comprising third switching means jointly responsive to the immediately preceding stage second storage capacitor being in its first state and said stage second storage capacitor being in its first state for placing said stage first storage capacitor in said second state, and fourth switching means jointly responsive to the immediately preceding stage second storage capacitor being in its first state and said stage second storage capacitor being in its second state for placing said stage first storage capacitor in its first state, and means for resetting each stage to an initial state including means for generating a reset signal, means for applying said reset signal to each first storage capacitor second terminal, each stage second switching means being jointly responsive to said source signal and said reset signal being applied to said stage first storage capacitor to unconditionally place said stage second storage capacitor in its first state.

10. A binary counter comprising an input stage and a plurality of stages each having an input and an output, the input of each of said plurality of stages being connected to the output of the immediately preceding stage, the input of said output stage being connected to a first signal source, a second signal source, means for applying said second signal to each stage at the same time; each of said plurality of stages comprising a first storage device operative in first and second states, a second storage device connected to said output and operative in first and second states, first switching means connected between said input and said output jointly responsive to said second signal and the stage first storage device being in its first state for connecting said stage input to said stage output, said first signal being applied through the first switching means of all preceding stages and said stage to said stage second storage device to place said stage second storage device in its first state when said stage and all preceding stage first storage devices are in their first states, second switching means jointly responsive to said second signal and said stage first storage device being in its second state for placing said stage second storage device in its second state, apparatus operative upon termination of said second signal comprising third switching means jointly responsive to the immediately preceding stage second storage device being in its first state and said stage second storage device being in its first state for placing said stage first storage device in its second state, and fourth switching means jointly responsive to said immediately preceding stage second storage device being in its first state and said stage second storage device being in its second state for placing said stage first storage device in its first state.

11. A binary counter according to claim 10 wherein said input stage comprises first and second storage devices operative in first and second states, first switching means jointly responsive to said second signal and said input stage first storage device being in its first state for applying said first signal to said input stage second storage device to place said input stage second storage device in its first state, second switching means jointly responsive to said second signal and said input stage first storage device being in its second state for placing said input stage second storage device in its second state, and apparatus operative upon termination of said second signal comprising third switching means responsive to said input stage second storage device being in its first state for placing said input stage first storage device in its second state and means responsive to said input stage second storage device being in its second state for placing said input stage first storage device in its first state.

12. A binary counter according to claim 11 wherein each first storage device comprises a storage capacitor having first and second terminals, and each second storage device comprises a storage capacitor having first and second terminals.

13. A binary counter according to claim 12 wherein each first switching means comprises first and second semiconductor devices each having first, second and control electrodes and a noninverting amplifier having an input and an output, each stage first semiconductor device first electrode being connected to its stage input, each stage first semiconductor device second electrode being connected to its stage amplifier input, each stage first semiconductor device control electrode being connected to its stage first storage capacitor first terminal, each stage second semiconductor device first electrode being connected to its stage amplifier output, each stage second semiconductor device second electrode being connected to its stage output and to said stage second storage capacitor first terminal, and each stage second semiconductor device control electrode being connected to said second signal applying means.

14. A binary counter according to claim 13 wherein each second switching means comprises third and fourth semiconductor devices each having first, second and control electrodes, first resistive means having first and second terminals, a positive voltage source and a reference voltage source, said first resistive means first terminal being connected to said positive voltage source, said third semiconductor device first electrode being connected to its stage first resistive means second terminal, said third semiconductor device second electrode being connected to said reference voltage source, said stage third semiconductor device control electrode being connected to its stage first storage capacitor first terminal, said stage fourth semiconductor device first electrode being connected to its stage amplifier output, said stage fourth semiconductor device second electrode being connected to said reference voltage source, said stage fourth semiconductor device control electrode being connected to its stage third semiconductor device first electrode.

15. A binary counter according to claim 14 wherein said third switching means comprises a fifth semiconductor device having first, second and control electrodes and second resistive means having first and second terminals, said second resistive means first terminal being connected to said positive voltage source, said fifth semiconductor device first electrode being connected to its stage resistive means second electrode, said fifth semiconductor device second electrode being connected to its stage first storage capacitor first terminal, one control electrode of said fifth semiconductor device being connected to said signal applying means, another control electrode of said fifth semiconductor device except said first stage fifth semiconductor device being connected to the output of the immediately preceding stage, the other control electrode of the first stage fifth semiconductor device being connected to said second signal applying means.

16. A binary counter according to claim 15 wherein each fourth switching means comprises a sixth semiconductor device having first, second and control electrodes, said sixth semiconductor device first electrode being connected to its stage second resistive means second terminal, said sixth semiconductor device second electrode being connected to said reference voltage source, and said sixth semiconductor device control electrode being connected to its stage second storage capacitor first terminal.

17. A binary counter according to claim 16 wherein each semiconductor device comprises an insulated gate field effect transistor having source, gate and drain electrodes, said drain electrode corresponding to said semiconductor device first electrode, said source electrode corresponding to said semiconductor device second electrode and said gate electrode corresponding to said semiconductor device control electrode.

18. A binary counter according to claim 17 wherein all insulated gate field effect transistors are of one conductivity type.

19. A binary counter according to claim 17 wherein each of the second terminals of all first and second storage capacitors are connected to said reference voltage source.

20. A binary counter according to claim 17 further comprising means for resetting each stage to an initial state including means for generating a reset signal, means for applying said reset signal to each stage second storage capacitor second terminal in the absence of said second signal, each stage fourth switching means being responsive to said reset signal applied to the second storage capacitor of its stage to unconditionally place the first storage capacitor of its stage in its second state, and the second terminal of each first stoage capacitor being connected to said reference voltage source.

21. A binary counter according to claim 17 further comprising means for resetting each stage to an initial state including means for generating a reset signal, means for applying said reset signal to each stage first storage capacitor second terminal, each stage second switching means being jointly responsive to said second signal and said reset signal applied to said stage first storage capacitor second terminal to unconditionally place said stage second storage capacitor in its first state, and the second terminal of each second storage capacitor being connected to said reference voltage source.

22. A counter comprising a first stage and a plurality of cascaded stages, each stage having an input and an output, a signal source, a charging voltage source, means for applying the signal from said source to all stages at the same time, the output of each stage being connected to the input of the immediately succeeding stage, the input of said first stage being connected to said charging voltage source, each stage comprising first and second storage capacitors operative in first and second states, said second storage capacitor being connected to its stage output, means jointly responsive to said signal and said stage first storage capacitor being in its first state for connecting said stage input to said stage output, said stage second storage capacitor being charged to its first state by said charging voltage source through all preceding stages only when said stage first storage capacitor and all preceding stage first storage capacitors are in their first states, means responsive to said signal for switching said stage second storage capacitor to its second state only when said stage first storage capacitor is in its second state, apparatus operative upon termination of said signal including means responsive to the immediately preceding stage second storage capacitor and said stage second storage capacitor being in third first states for switching said stage first storage capacitor to its second state, and means responsive to the immediately preceding stage second storage capacitor being in its first state and said stage second storage capacitor being in its second state for switching said stage first storage capacitor to its first state.

23. A counter comprising a plurality of cascaded stages and an input stage, an energy source, the output of each stage being connected to the input of the immediately succeeding stage, the input of said first stage being connected to said energy source, a source of signals, means responsive to said signal from said source for applying first and second successively occurring pulses to all stages, each stage comprising a first store operative in first and second states, a second store connected to its stage output and operative in first and second states, first means jointly responsive to said first pulse and said stage first store being in its first state for connecting said stage input to said stage output for energizing said stage second store to its first state from said energy source through the cascaded first means of all preceding stages when all preceding stage first stores and said stage first store are in their first states, means jointly responsive to said second pulse and said stage second store being in its first state and the immediately preceding stage second store being in its first state for placing said stage first store in its second state, means jointly responsive to said second pulse and said stage second store being in its second state and the immediately preceding stage second store being in its first state for placing said stage first store in its first state, and means jointly responsive to said first pulse and to the input stage first store being in its second state for placing all stage second stores in their second states.

24. A counter comprising a first stage and a plurality of cascaded stages, each having an input and an output, the output of each stage being connected to the input of the immediately succeeding stage, a source of signals to be counted, means responsive to each signal to be counted for generating first, second and third pulses, each stage comprising first and second stores operative in first and second states, first means jointly responsive to said first pulse and the first store of said stage and all preceding stage first stores being in their first states for placing said stage second store in its first state, second means jointly responsive to said second pulse and said stage second store being in its first state and the immediately preceding stage second store being in its first state for placing said stage first store in its second state, third means jointly responsive to said second pulse and said stage second store being in its second state and the immediately preceding state second store being in its first state for placing said stage first store in its first state, and means responsive to said third pulse for placing the second stores of all stages in their second states.

25. A binary counter comprising an energy source, a counting signal source, and first and second stages each comprising an input and an output, first and second stores operative in first and second opposite states, said second store being connected to said stage output, said first stage input being connected to said energy source, said first stage output being connected to said second stage input, means for simultaneously applying said counting signal to said first and second stages, said first stage further comprising means jointly responsive to said counting signal and said first store being in its first state for connecting said first stage input to said first stage output to energize said first stage second store to its first state, second means jointly responsive to said counting signal and said first stage first store being in its second state for placing said first stage second store in its second state, apparatus operative upon termination of said counting signal comprising third means responsive to the state of said first stage second store for placing said first stage first store in a state opposite to the state of the first stage second store, said second stage further comprising means jointly responsive to said counting signal and said second stage first store being in its first state for connecting said second stage input to said second stage output to energize said second stage second store to its first state from said energy source through said first stage input-output connecting means when said first stage first store is in its first state, means jointly responsive to said counting signal and said second stage first store being in its second state for placing said second stage second store in its second state, and apparatus operative upon termination of said counting signal comprising means responsive to the first stage second store being in its first state and the state of said second stage second store for placing said second stage first store in a state opposite to the state of said second stage second store.

* * * * *